(12) United States Patent
Kloth et al.

(10) Patent No.: US 8,170,025 B2
(45) Date of Patent: May 1, 2012

(54) SWITCH PORT ANALYZERS

(75) Inventors: Raymond J. Kloth, Saratoga, CA (US); Thomas James Edsall, Cupertino, CA (US); Kalyan K. Ghosh, Santa Clara, CA (US); Gaurav Rastogi, Mountain View, CA (US); Dinesh Ganapathy Dutt, Sunnyvale, CA (US); Matthew Cressa, Grass Valley, CA (US)

(73) Assignee: Cisco Technology, Inc., San Jose, CA (US)

( * ) Notice: Subject to any disclaimer, the term of this patent is extended or adjusted under 35 U.S.C. 154(b) by 435 days.

(21) Appl. No.: 12/324,703

(22) Filed: Nov. 26, 2008

(65) Prior Publication Data

US 2009/0103566 A1 Apr. 23, 2009

Related U.S. Application Data

(62) Division of application No. 10/655,452, filed on Sep. 3, 2003, now Pat. No. 7,474,666.

(51) Int. Cl.
*H04L 12/28* (2006.01)

(52) U.S. Cl. ........ 370/392; 370/389; 370/401; 370/241; 709/236; 709/245

(58) Field of Classification Search .................. 709/236, 709/245
See application file for complete search history.

(56) References Cited

U.S. PATENT DOCUMENTS

| | | | |
|---|---|---|---|
| 5,481,735 A | 1/1996 | Mortensen et al. | |
| 5,515,376 A | 5/1996 | Murthy et al. | |
| 5,610,905 A | 3/1997 | Murthy et al. | |
| 5,742,604 A | 4/1998 | Edsall et al. | |
| 5,790,554 A | 8/1998 | Pitcher et al. | |
| 5,920,705 A | 7/1999 | Lyon et al. | |
| 6,268,808 B1 | 7/2001 | Iryami et al. | |
| 6,272,180 B1 | 8/2001 | Lei | |
| 6,282,678 B1 | 8/2001 | Snay et al. | |
| 6,324,669 B1 | 11/2001 | Westby | |

(Continued)

FOREIGN PATENT DOCUMENTS

WO WO0178308 10/2001

(Continued)

OTHER PUBLICATIONS

US Notice of Allowance dated Apr. 19, 2010 from related U.S. Appl. No. 10/409,427.

(Continued)

*Primary Examiner* — Duc C Ho
(74) *Attorney, Agent, or Firm* — Weaver Austin Villeneuve & Sampson LLP

(57) ABSTRACT

Methods and devices are provided for non-disruptive monitoring of network traffic through one or more ports of a Fibre Channel network device. Preferred embodiments of the invention are used in conjunction with the switched port analyzer ("SPAN") and/or remote SPAN ("RSPAN") features. SPAN mode operation allows traffic through any Fibre Channel interface of a network device to be replicated and delivered to a single port on the same network device. Ingress SPAN allows the monitoring of some or all packets that ingress a specified port or ports. Egress SPAN allows the monitoring of some or all packets that egress a specified port or ports. RSPAN allows the delivery of the replicated traffic to a port on a remote network device. Filtering may be applied, for example, to SPAN packets having selected virtual storage area network numbers.

16 Claims, 12 Drawing Sheets

U.S. PATENT DOCUMENTS

| | | | |
|---|---|---|---|
| 6,377,571 | B1 | 4/2002 | Tai |
| 6,499,107 | B1 | 12/2002 | Gleichauf et al. |
| 6,553,036 | B1 | 4/2003 | Miller et al. |
| 6,650,641 | B1 | 11/2003 | Albert et al. |
| 6,704,883 | B1 | 3/2004 | Zhang et al. |
| 6,748,431 | B1 | 6/2004 | Feig et al. |
| 6,886,102 | B1* | 4/2005 | Lyle .............................. 726/23 |
| 6,888,800 | B1 | 5/2005 | Johnson et al. |
| 6,892,287 | B1 | 5/2005 | Millard et al. |
| 6,904,061 | B2 | 6/2005 | Schmitt et al. |
| 6,954,437 | B1 | 10/2005 | Sylvest et al. |
| 6,959,007 | B1 | 10/2005 | Vogel et al. |
| 7,007,208 | B1 | 2/2006 | Hibbert et al. |
| 7,020,715 | B2 | 3/2006 | Venkataraman et al. |
| 7,107,328 | B1 | 9/2006 | Muthiyan et al. |
| 7,124,198 | B2 | 10/2006 | Pinkerton |
| 7,164,657 | B2 | 1/2007 | Phaal |
| 7,206,863 | B1 | 4/2007 | Oliveira et al. |
| 7,292,567 | B2 | 11/2007 | Terrell et al. |
| 7,299,277 | B1 | 11/2007 | Moran et al. |
| 7,310,447 | B2 | 12/2007 | Yano et al. |
| 7,339,929 | B2 | 3/2008 | Zelig et al. |
| 7,417,978 | B1 | 8/2008 | Chou et al. |
| 7,447,197 | B2 | 11/2008 | Terrell et al. |
| 7,474,666 | B2 | 1/2009 | Kloth et al. |
| 7,496,043 | B1 | 2/2009 | Leong et al. |
| 7,536,470 | B2 | 5/2009 | Li et al. |
| 7,782,784 | B2 | 8/2010 | Agrawal et al. |
| 2001/0055274 | A1 | 12/2001 | Hegge et al. |
| 2002/0042866 | A1 | 4/2002 | Grant et al. |
| 2002/0046289 | A1 | 4/2002 | Venkaraman et al. |
| 2002/0116564 | A1 | 8/2002 | Paul et al. |
| 2002/0136223 | A1 | 9/2002 | Ho |
| 2002/0143849 | A1 | 10/2002 | Newell et al. |
| 2002/0156924 | A1 | 10/2002 | Czeiger et al. |
| 2002/0170004 | A1 | 11/2002 | Parrett et al. |
| 2002/0186697 | A1 | 12/2002 | Thakkar |
| 2002/0191649 | A1 | 12/2002 | Woodring |
| 2003/0026251 | A1 | 2/2003 | Morris et al. |
| 2003/0028634 | A1 | 2/2003 | Oshizawa |
| 2003/0040897 | A1 | 2/2003 | Murphy et al. |
| 2003/0043755 | A1 | 3/2003 | Mitchell |
| 2003/0053464 | A1 | 3/2003 | Chen et al. |
| 2003/0076779 | A1 | 4/2003 | Frank et al. |
| 2003/0084319 | A1 | 5/2003 | Tarquini et al. |
| 2003/0091037 | A1 | 5/2003 | Latif et al. |
| 2003/0118053 | A1 | 6/2003 | Edsall et al. |
| 2003/0131182 | A1 | 7/2003 | Kumar et al. |
| 2003/0137937 | A1 | 7/2003 | Tsukishima et al. |
| 2003/0152028 | A1 | 8/2003 | Raisanen et al. |
| 2003/0202536 | A1 | 10/2003 | Foster et al. |
| 2003/0214913 | A1 | 11/2003 | Kan et al. |
| 2003/0227874 | A1 | 12/2003 | Wang |
| 2004/0034492 | A1 | 2/2004 | Conway |
| 2004/0054758 | A1 | 3/2004 | Chang et al. |
| 2004/0085994 | A1 | 5/2004 | Warren et al. |
| 2004/0086027 | A1 | 5/2004 | Shattil |
| 2004/0146063 | A1 | 7/2004 | Golshan et al. |
| 2004/0151191 | A1* | 8/2004 | Wu et al. ........................ 370/401 |
| 2004/0153854 | A1 | 8/2004 | Agrawal et al. |
| 2004/0153863 | A1 | 8/2004 | Klotz et al. |
| 2005/0114710 | A1 | 5/2005 | Cornell et al. |
| 2006/0168321 | A1 | 7/2006 | Eisenberg et al. |
| 2006/0274755 | A1* | 12/2006 | Brewer et al. ................. 370/392 |
| 2008/0008202 | A1* | 1/2008 | Terrell et al. .................. 370/401 |

FOREIGN PATENT DOCUMENTS

| | | |
|---|---|---|
| WO | WO02082728 | 10/2002 |

OTHER PUBLICATIONS

US Allowed Claims (Apr. 19, 2010) from related U.S. Appl. No. 10/409,427.

US Final Office Action dated May 17, 2010 from related U.S. Appl. No. 10/346,050.

US Notice of Allowance dated Sep. 7, 2010 from related U.S. Appl. No. 10/346,050.

Cn Third Office Action dated Apr. 21, 2011 from Chinese Patent Appl. No. 200480020541.5.

M. Rajagopal et al., "Fibre Channel Over TCP/IP (FCIP)", IETF Aug. 2002 pp. 1-68, XP002283576.

http://en.wikipedia.org/wiki/IP_protocol, Jan. 25, 2011.

http://en.wikipedia.org/wiki/Network_layer, Jan. 25, 2011.

http://en.wikipedia.org/wiki/Generic_Routing_Encapsulation, Jan. 25, 2011.

http://en.wikipedia.org/wiki/MPLS, Jan. 25, 2011.

http://en.wikipedia.org/wiki/IPv4#Fragmentation, Jan. 25, 2011.

International Search Report and Written Opinion dated Feb. 7, 2005, from related Int'l Appl. No. PCT/US2004/027217.

Partial International Search Report dated Dec. 3, 2004, from related Int'l Appl. No. PCT/US2004/027217.

International Search Report dated Jun. 17, 2004, from related Int'l Appl. No. PCT/US03/40911.

Australian Office Action dated Jul. 18, 2008 for AU Patent Appl. No. 2003301218.

Canadian Office Action dated Feb. 3, 2009 from Appl. No. 2,512,338.

CN Second Chinese Office Action dated Aug. 24, 2007 from Chinese Patent Appl. No. 200380108620.7 filed Dec. 18, 2003.

CN First Office Action dated Feb. 9, 2007 from Chinese Patent Appl. No. 200380108620.7 filed Dec. 18, 2003.

CN First Office Action dated May 23, 2008 from Chinese Patent Appl. No. 200480020541.5.

CN Second Office Action dated Nov. 27, 2009 from Chinese Patent Appl. No. 200480020541.5.

EP Examiners Communication pursuant to Article 96[2] EPC dated Nov. 9, 2007 from European Appl. No. 04781826.5, 5 pgs.

EP Examiners Communication pursuant to Article 96[2] EPC dated Sep. 18, 2006 from related EP Appl. No. 04781826.5, 11 pgs.

EP Examiners Communication pursuant to Article 96[2] EPC dated Jul. 26, 2007 from European Appl. No. 03815236.9, 4 pgs.

Walker et al., "Method and Apparatus for Remotely Monitoring Network Traffic Through a Generic Network," U.S. Appl. No. 10/346,050, filed Jan. 15, 2003 [Palermo].

US Office Action dated Feb. 8, 2007, from related U.S. Appl. No. 10/346,050 [Palermo].

US Office Action dated Nov. 27, 2007, from related U.S. Appl. No. 10/346,050 [Palermo].

US Office Action dated Apr. 17, 2008, from related U.S. Appl. No. 10/346,050 [Palermo].

US Office Action dated Sep. 3, 2008, from related U.S. Appl. No. 10/346,050 [Palermo].

US Office Action dated Mar. 16, 2009 for US Patent, from related U.S. Appl. No. 10/346,050 [Palermo].

US Office Action dated Nov. 14, 2007, from related U.S. Appl. No. 10/409,427.

US Final Office Action dated Apr. 30, 2008, from related U.S. Appl. No. 10/409,427.

US Office Action dated Sep. 15, 2008, from related U.S. Appl. No. 10/409,427.

US Final Office Action dated Mar. 18, 2009, from related U.S. Appl. No. 10/409,427.

US Office Action dated Sep. 21, 2009, from related U.S. Appl. No. 10/409,427.

US Office Action dated May 15, 2007, from related U.S. Appl. No. 10/655,452.

US Office Action dated Oct. 4, 2007, from related U.S. Appl. No. 10/655,452.

US Office Action dated Mar. 5, 2008, from related U.S. Appl. No. 10/655,452.

US Notice of Allowance and Allowability dated Sep. 19, 2008, from related U.S. Appl. No. 10/655,452.

US Allowed Claims from related U.S. Appl. No. 10/655,452, Sep. 19, 2008.

Sharma, et al., U.S. Appl. No. 11/114,257, filed Apr. 25, 2005.

US Office Action dated Jul. 21, 2008, from related U.S. Appl. No. 11/114,257.
US Office Action dated May 14, 2009, from related U.S. Appl. No. 11/114,257.
US Final Office Action dated Nov. 24, 2009, from related U.S. Appl. No. 11/114,257.

US Office Action dated Oct. 5, 2009, from related U.S. Appl. No. 10/346,050 [Palermo].
US Office Action dated Jan. 27, 2010, from related U.S. Appl. No. 10/346,050 [Palermo].

* cited by examiner

SWITCH PORT ANALYZERS

CLAIM TO PRIORITY

This application claims priority to co-pending U.S. patent application Ser. No. 10/655,452, filed on Sep. 3, 2003 and entitled "SWITCH PORT ANALYZERS," which is hereby incorporated by reference and for all purposes.

CROSS-REFERENCE TO RELATED APPLICATIONS

This application is related to U.S. patent application Ser. Nos. 10/409,427 and 10/346,050, which are hereby incorporated by reference for all purposes.

BACKGROUND OF THE INVENTION

1. Field of the Invention

This invention relates generally to network management and specifically relates to troubleshooting network devices that use the Fibre Channel ("FC") protocol.

2. Description of Related Art

Network devices occasionally malfunction. Such malfunctions can result in the network devices going down, in congestion of traffic on the network and in other negative effects. When such malfunctions occur, network managers need to analyze traffic on one or more network devices in order to troubleshoot the problem. Moreover, network traffic should be analyzed in other situations, such as during a system upgrade, when bringing up a network, for monitoring a network, etc.

Several limitations may be encountered when configuring networks such as local area networks, storage area networks and the like. There are a variety of network devices, such as routers, switches, bridges, etc., which may be used to configure such networks. Some of these network devices have greater capabilities than others. For example, some devices may readily be configured to support logical networks superimposed upon a physical network (e.g., virtual local area networks ("VLANs") or virtual storage area networks ("VSANs")) and some may not.

In order to allow multiple VLANs to share a single inter-switch link on the underlying physical topology, the inter-switch link protocol ("ISL") was developed at Cisco Systems. See for example U.S. Pat. No. 5,742,604, entitled "Inter-switch link mechanism for connecting high-performance network switches," Edsall, et al., issued on Apr. 21, 1998 to Cisco Systems, Inc., which is hereby incorporated by reference for all purposes. ISL provides an encapsulation mechanism for transporting packets between ports of different switches in a network on the basis of VLAN associations among those ports. (The terms "frame" and "packet" are equivalent as used herein.)

FC protocol is increasingly used for storage area networks and similar networks. One such device used as a fabric network device for storage area networks is a Multi-layer Data Switch ("MDS"), manufactured by Cisco Systems, Inc. Data ingress and egress the MDS in FC protocol via FC ports. Accordingly, when a network manager needs to troubleshoot a problem with a network device that is using FC protocol, the device used by the network manager must be able to capture and analyze frames in FC protocol.

Currently, devices known as FC analyzers are available for capturing and analyzing data from an FC port. An FC analyzer is configured to receive FC frames from a network device and to allow an engineer, network administrator, etc., to view and analyze the FC frames. Analysis of the FC frames and knowledge of types of errors associated with the FC frames can be useful in identifying the underlying problems with the network.

However, FC analyzers are normally interposed between two switches in an FC network. Therefore, connecting the FC analyzer causes disruption of the network and user "down time." Moreover, network disruption can change the setup environment and consequently make a problem more difficult to debug. In addition, the people troubleshooting the FC network may not be at the same location as, for example, a switch believed to be causing a problem. It would be desirable to have more flexible devices and methods for the analysis of FC networks as compared to the prior passive FC Analyzer technology.

SUMMARY OF THE INVENTION

Methods and devices are provided for non-disruptive monitoring of network traffic through one or more ports of an FC network device. Preferred embodiments of the invention are used in conjunction with the switched port analyzer ("SPAN") and/or remote SPAN ("RSPAN") features. SPAN mode operation allows traffic through any FC interface of a network device to be replicated and delivered to a single port on the same network device. Ingress SPAN allows the monitoring of some or all packets that ingress a specified port or ports. Egress SPAN allows the monitoring of some or all packets that egress a specified port or ports. RSPAN allows the delivery of the replicated traffic to a port on a remote network device. Filtering may be applied, for example, to SPAN packets having selected virtual storage area network (VSAN) numbers.

According to some aspects of the invention, replicated FC frames may be truncated to various degrees, to allow greater throughput during SPAN mode operation.

According to some embodiments of the invention, a network device is provided for use in a Fibre Channel network. The network device configured to do the following: receive a first Fibre Channel packet at an ingress port, a header of the first Fibre Channel packet indicating that the first Fibre Channel packet should be transmitted to a first egress port; store a copy of the first Fibre Channel packet in a buffer associated with the ingress port; transmit a first replica of the first Fibre Channel packet to the first egress port; and transmit a second replica of the first Fibre Channel packet to a second egress port. The second egress port may or may not be configured to disregard the buffer-to-buffer credit flow control mechanism of the Fibre Channel protocol.

The second egress port may be a port of the network device or a port of another network device. The network device may be configured to transmit the second replica of the first Fibre Channel packet to the second egress port regardless of the identity of the first egress port.

The network device may also be configured to do the following: receive a second Fibre Channel packet at an ingress port, a header of the second Fibre Channel packet indicating that the second Fibre Channel packet should be transmitted to a third egress port; store a copy of the second Fibre Channel packet in a buffer associated with the ingress port; transmit a first replica of the second Fibre Channel packet to the third egress port; and transmit a second replica of the second Fibre Channel packet to the second egress port. The second egress port is preferably configured to disregard the buffer-to-buffer credit flow control mechanism of the Fibre Channel protocol.

Some implementations of the invention provide a method for use in a Fibre Channel network. The method includes the following steps: receiving a first Fibre Channel packet, a header of the first Fibre Channel packet indicating that the first Fibre Channel packet should be transmitted to a first egress port; storing a copy of the first Fibre Channel packet; transmitting a first replica of the first Fibre Channel packet to the first egress port; and transmitting a second replica of the first Fibre Channel packet to a second egress port. The second egress port is configured to disregard the buffer-to-buffer credit flow control mechanism of the Fibre Channel protocol.

The second egress port may be a port of the network device or a port of another network device. The second replica of the first Fibre Channel packet may be transmitted to the second egress port regardless of the identity of the first egress port.

The method may also include the following steps: receiving a second Fibre Channel packet, a header of the second Fibre Channel packet indicating that the second Fibre Channel packet should be transmitted to a third egress port; storing a copy of the second Fibre Channel packet; transmitting a first replica of the second Fibre Channel packet to the third egress port; and transmitting a second replica of the second Fibre Channel packet to the second egress port. The second egress port disregards the buffer-to-buffer credit flow control mechanism of the Fibre Channel protocol.

Some embodiments of the invention provide a computer program embodied in a computer-readable medium. The computer program includes instructions for controlling a network device to perform the following steps: receiving a first Fibre Channel packet at an ingress port of the network device, a header of the first Fibre Channel packet indicating that the first Fibre Channel packet should be transmitted to a first egress port of the network device; storing a copy of the first Fibre Channel packet in a buffer associated with the ingress port; transmitting a first replica of the first Fibre Channel packet to the first egress port; and transmitting a second replica of the first Fibre Channel packet to a second egress port.

The second egress port is configured to disregard the buffer-to-buffer credit flow control mechanism of the Fibre Channel protocol. The second egress port may be a port of the network device or a port of another network device.

Other embodiments of the invention provide a network device for use in a Fibre Channel network. The network device is configured to do the following: receive a Fibre Channel packet at an ingress port; determine, based on a header of the Fibre Channel packet, that the Fibre Channel packet should be transmitted to a first egress port and that the Fibre Channel packet has been assigned a virtual storage area network number; store a copy of the Fibre Channel packet in a buffer associated with the ingress port; transmit a first replica of the Fibre Channel packet to the first egress port; and transmit a second replica of the Fibre Channel packet to a second egress port when the fabric to which the Fibre Channel packet belongs is allowed for SPAN. The fabric identification could be based on the fabric or domain ID from the FC header or the logical virtual storage area network number.

Some aspects of the invention provide a method for use in a Fibre Channel network. The method includes the following steps: receiving a Fibre Channel packet; determining, based on a header of the Fibre Channel packet, that the Fibre Channel packet should be transmitted to a first egress port and that the Fibre Channel packet has been assigned a virtual storage area network number; storing a copy of the Fibre Channel packet; transmitting a first replica of the Fibre Channel packet to the first egress port; and transmitting a second replica of the Fibre Channel packet to a second egress port when the virtual storage area network number is within a predetermined range. The second egress port may be a port of the network device or a port of another network device.

Other embodiments of the invention provide a computer program embodied in a computer-readable medium. The computer program includes instructions for controlling a network device to perform the following steps: receive a Fibre Channel packet at an ingress port; determine, based on a header of the Fibre Channel packet, that the Fibre Channel packet should be transmitted to a first egress port and that the Fibre Channel packet has been assigned a virtual storage area network number; store a copy of the Fibre Channel packet in a buffer associated with the ingress port; transmit a first replica of the Fibre Channel packet to the first egress port; and transmit a second replica of the Fibre Channel packet to a second egress port when the virtual storage area network number is within a predetermined range. The second egress port may be a port of the network device or a port of another network device.

Yet other embodiments of the invention provide a network device for use in a Fibre Channel network. The network device is configured to do the following: receive a Fibre Channel packet at an ingress port; determine that the Fibre Channel packet should be transmitted to a first egress port and that the Fibre Channel packet has been assigned a virtual storage area network number; store a copy of the Fibre Channel packet in a buffer associated with the ingress port; transmit a first replica of the Fibre Channel packet to the first egress port; and apply a rule to determine whether to transmit a second replica of the Fibre Channel packet to a second egress port. The rule may involve the ingress port, the first egress port and/or the virtual storage area network number.

Still other implementations of the invention provide a method for use in a Fibre Channel network. The method includes the following steps: receiving a Fibre Channel packet; determining that the Fibre Channel packet should be transmitted to a first egress port and that the Fibre Channel packet has been assigned a virtual storage area network number; storing a copy of the Fibre Channel packet; transmitting a first replica of the Fibre Channel packet to the first egress port; and applying a rule to determine whether to transmit a second replica of the Fibre Channel packet to a second egress port. The rule may involve the ingress port, the first egress port and/or the virtual storage area network number.

Certain embodiments of the invention provide a computer program embodied in a computer-readable medium. The computer program includes instructions for controlling a network device to perform the following steps: receive a Fibre Channel packet at an ingress port; determine that the Fibre Channel packet should be transmitted to a first egress port and that the Fibre Channel packet has been assigned a virtual storage area network number; store a copy of the Fibre Channel packet in a buffer associated with the ingress port; transmit a first replica of the Fibre Channel packet to the first egress port; and apply a rule to determine whether to transmit a second replica of the Fibre Channel packet to a second egress port. The rule may involve the ingress port, the first egress port and/or the virtual storage area network number.

Some aspects of the invention provide a method of creating a Fibre Channel tunnel. The method involves receiving a Fibre Channel packet having a first Fibre Channel header and adding a second Fibre Channel header to the Fibre Channel packet.

The method may include the step of adding a first switch port analyzer header to the Fibre Channel packet. The first switch port analyzer header may include a version field, a truncation bit field, a session identification field, a reserved field, a field indicating that the Fibre Channel packet includes a second switch port analyzer header and/or a field indicating a length of an encapsulated frame.

The second switch port analyzer header may include a field indicating internal switch information and/or a field indicating a classification result for the Fibre Channel packet. The classification result field may include one or more subfields indicating a virtual storage area network number, an output index and/or a priority level.

Still other embodiments of the invention provide a computer program embodied in a computer-readable medium. The computer program includes instructions for controlling a network device to receive a Fibre Channel packet having a first Fibre Channel header and add a second Fibre Channel header to the Fibre Channel packet. The computer program may also include instructions for controlling the network device to add a first switch port analyzer header to the Fibre Channel packet. The first switch port analyzer header may include a version field, a truncation bit field, a session identification field, a reserved field, a field indicating that the Fibre Channel packet includes a second switch port analyzer header and/or a field indicating a length of an encapsulated frame.

The second switch port analyzer header may include a field indicating internal switch information and/or a field indicating a classification result for the Fibre Channel packet. The classification result field may include one or more subfields indicating a virtual storage area network number, an output index and/or a priority level.

Particular embodiments of the invention provide a computer program embodied in a computer-readable medium. The computer program includes instructions for controlling a port of a network device for use in a Fibre Channel protocol network to ignore the buffer-to-buffer credit flow control mechanism of the Fibre Channel protocol and allow data traffic only in the port's egress direction. The computer program may also include instructions for controlling the port to receive frames from within the network device. The computer program may also include instructions for controlling the port to output frames with or without an extended inter-switch link header.

Yet other implementations of the invention provide a method for controlling a port of a network device for use in a Fibre Channel protocol network. The method includes the steps of ignoring the buffer-to-buffer credit flow control mechanism of the Fibre Channel protocol; and allowing data traffic only in the port's egress direction. The method may include the step of controlling the port to receive frames from within the network device. The method may involve controlling the port to output frames with or without an extended inter-switch link header.

These and other features of the invention will be described below with respect to the following drawings.

DETAILED DESCRIPTION OF THE INVENTION

Figure 1:
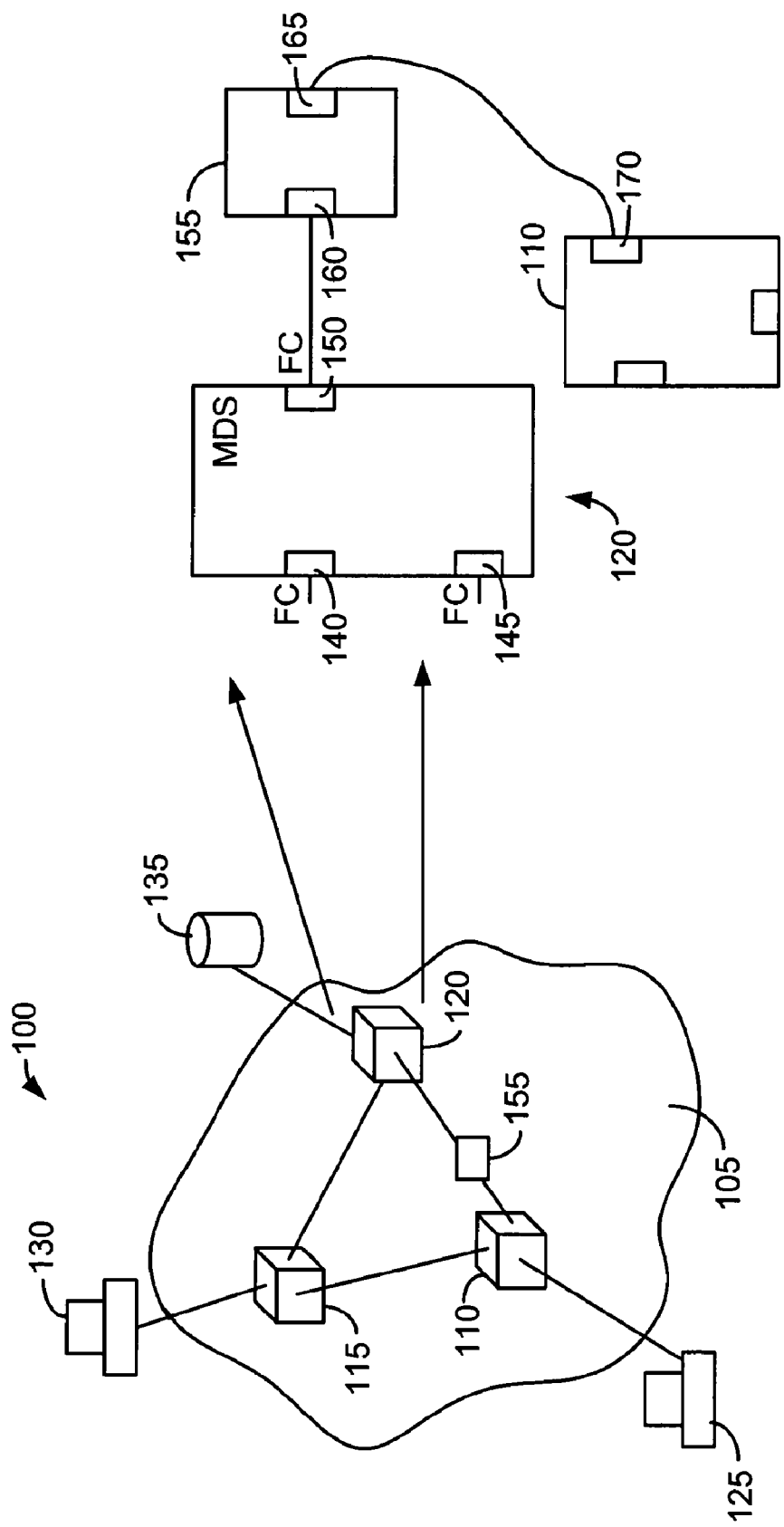
FIG. 1 illustrates a conventional method of connecting an FC analyzer to an FC network.

FIG. 1 depicts a prior art configuration for analyzing and troubleshooting a network device. Network 100 includes fabric 105, which includes network devices 110, 115 and 120. Network devices 110, 115 and 120 may be any type of network device known in the art that may be used to form a fabric of an FC network. Nodes 125 and 130 represent personal computers or similar devices with which users may interact with fabric 105, for example to access data within storage device 135.

An expanded view of network device 120 depicts FC ports 140, 145 and 150. In this example, network device 120 is an MDS device manufactured by Cisco Systems, Inc., as described above.

FC analyzer 155 is connected to network devices 120 and 110. Accordingly, receives FC frames from ports 150 and 170 of network devices 120 and 110, respectively.

Some network devices may be configured to support a novel frame format, known as extended inter-switch link ("EISL") format, which is the subject of other pending patent applications assigned to Andiamo Systems. The description of some embodiments and applications of EISL in U.S. patent application Ser. No. 10/034,160 is hereby incorporated by reference for all purposes. In one example, the EISL format allows a single network device to process frames or packets having different formats. For example, if network device 115 were configured to support EISL, network device 115 could process both FC frames and Ethernet frames. The EISL format also supports VLANs, VSANs and similar features.

An EISL format allows the implementation of an FC network with features and functionality beyond that provided by ISL format. In one example, the EISL format allows a port (known herein as a "trunking port") to transport frames of more than one format. For example, a trunking port can switch Ethernet and FC frames and is adaptable to transmitting frames of other formats as they are developed. An EISL header is used on EISL links to enable this transportation of different frame types.

In another example, the EISL format allows the implementation of multiple virtual storage area networks (VSANs) on a single physical network. In still other examples, the EISL format provides mechanisms for implementing forwarding mechanisms such as Multi-Protocol Label Switching (MPLS) or Time To Live (TTL) fields specifying how packets should be forwarded and when packets or frames should be dropped. Any format allowing for the implementation of multiple virtual storage area networks on a physical fibre channel network while also allowing the transmission of different frame types, forwarding fields, and/or time to live, etc. is referred to herein as an EISL format.

Figure 2:
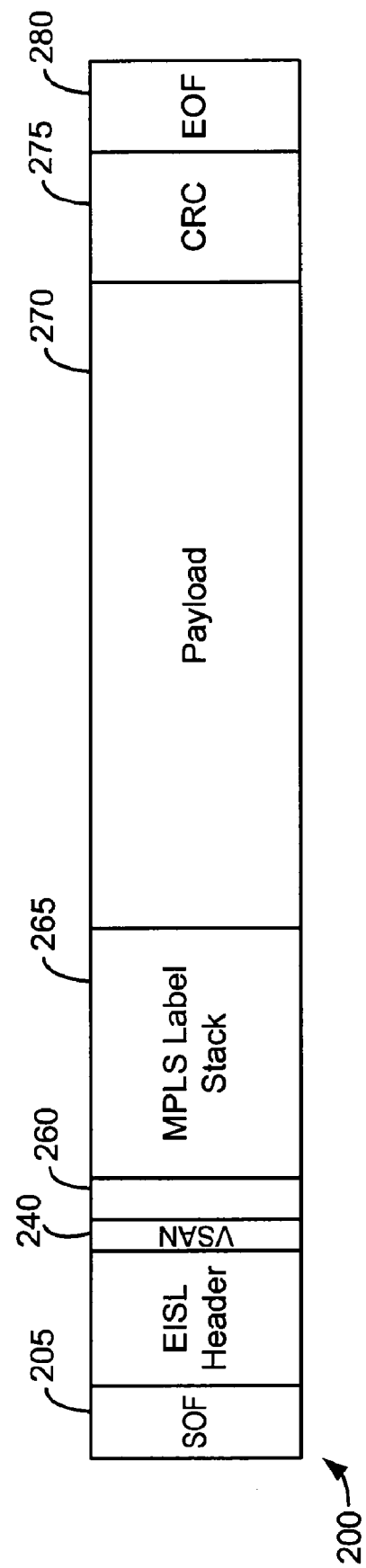
FIG. 2 is a diagram of an exemplary extended inter-switch link packet.

FIG. 2 indicates one example of an EISL frame. One of skill in the art will appreciate that the size, sequence and functionality of the fields within this EISL frame can vary from implementation to implementation. For example, the numbers of bits indicated for each field are different in alternative EISL frames.

The EISL frame 200 is bounded by start of frame delimiter ("SOF") 205 an end of frame delimiter ("EOF") 280. These delimiters enable an EISL-capable port to receive frames in a standard format at all times. If an EISL-capable port is not in EISL mode and receives frames in the EISL format, it accepts the frame according to some aspects of the invention. However, the port may not be able to send frames in EISL format.

In this embodiment, EISL header 260 includes VSAN field 240, which specifies the virtual storage area network number of payload 270. A VSAN allows for multiple logical or "virtual" storage area networks to be based upon a single physical storage area network. Accordingly, VSAN field 240 of EISL header 260 indicates the virtual storage area network to which this frame belongs.

MPLS label stack field 265 provides a common forwarding mechanism for both FC and Ethernet frames. Cyclic redundancy check ("CRC") field 275 is used for error detection.

Exchange Link Parameter ("ELP") protocol is an existing FC protocol that is used for communication with E ports. Similarly, Exchange Switch Capability ("ESC") protocol is an existing FC protocol that is used for communication between E ports. These protocols can be used to exchange information regarding the capabilities of network devices.

Figure 3:
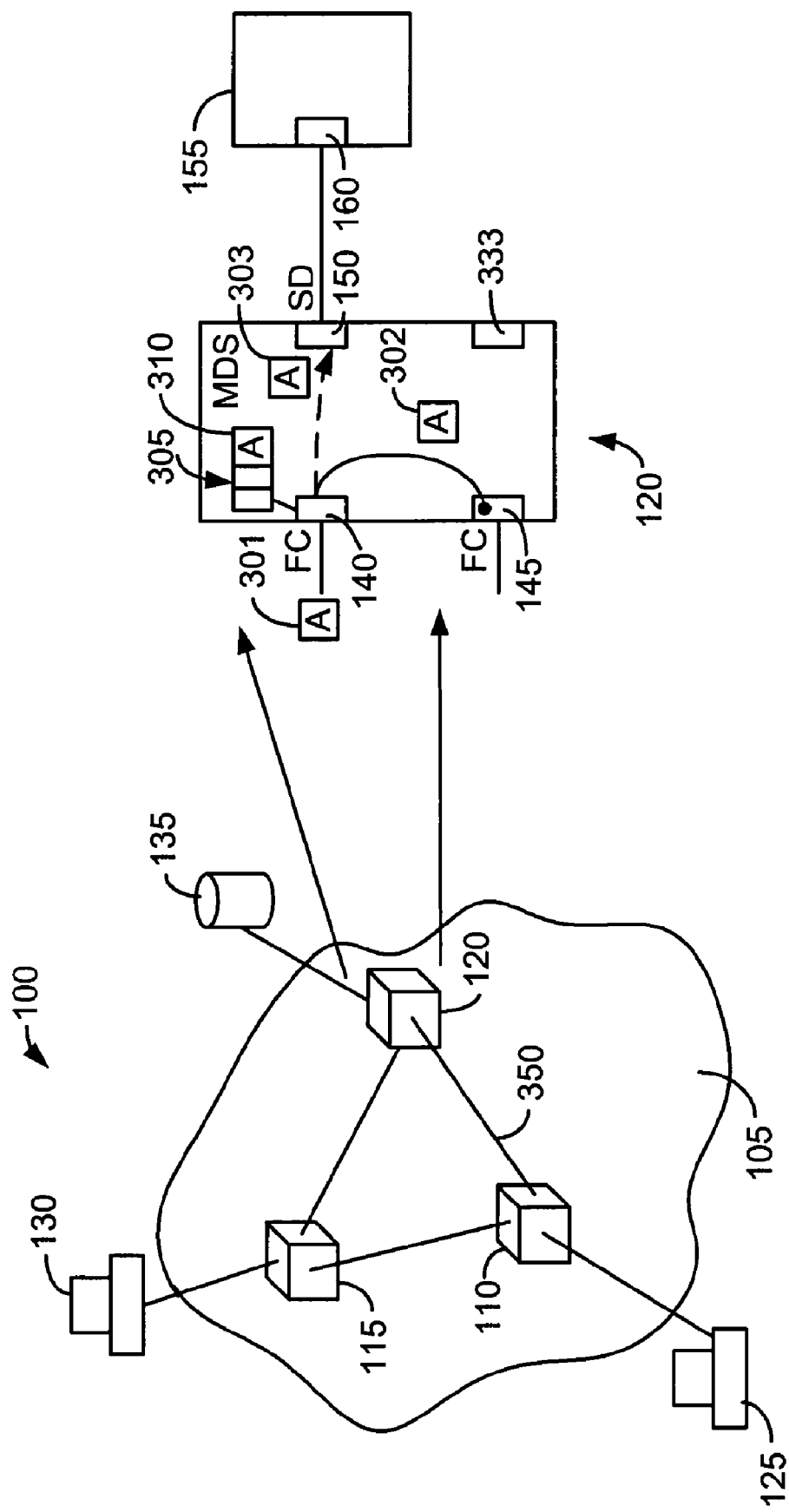
FIG. 3 illustrates a method of connecting an FC analyzer to an FC network that is made possible by the present invention.

FIG. 3 depicts an apparatus for analyzing FC frames according to some embodiments of the present invention. In FIG. 3, ports 140 and 145 of network device 120 are configured to receive FC frames from and send FC frames to other network devices in fabric 105. However, in this embodiment, port 150 has been configured to receive copies of selected frames according to some version of switched port analyzer ("SPAN") mode, a proprietary mode developed by Cisco Systems, Inc.

Overview of SPAN

Although SPAN will be described in detail in subsequent portions of this application, an overview of SPAN is set forth in the following paragraphs.

SPAN (also referred to herein as "local SPAN") monitors network traffic though an FC interface. Traffic through any FC interface can be replicated to one or more specially-configured ports, called SPAN destination ports (SD ports). The SPAN feature is non-intrusive and does not affect switching of network traffic for any SPAN source ports; it may, however, in some cases slow down the traffic in source ports.

According to preferred embodiments, when a port is configured as an SD port, packets may be output from the SD port (egress), but the SD port cannot act as an ingress port. The SD port may or may not be flow-controlled. However, in preferred embodiments, an SD port does not participate in the "buffer-to-buffer" credit system of the FC protocol. In preferred embodiments, no FC link level control protocol (FC-1) is used with an external device (e.g., FC analyzer 155) that receives frames from an SD port. Instead, data are output from the SD port as if placed on the wire 205 and no handshaking is performed.

For example, when port 150 is operating as an SD port, copies of FC frames involving some or all traffic on device 120, including traffic on port 140, port 145 and/or other ports, may be transmitted by SD port 150.

SPAN sources refer to the interfaces from which traffic can be monitored. In preferred embodiments, one can also specify a VSAN number (or a range of VSAN numbers) as a SPAN source, in which case all supported interfaces in the specified VSAN(s) are included as SPAN sources. In preferred implementations, one can choose to SPAN traffic in the ingress direction, the egress direction, or both directions for any source interface. Traffic entering the switch fabric through an ingress source interface is "spanned" or replicated to the SD port. Similarly, traffic exiting the switch fabric through an egress source interface is "spanned" or replicated to the SD port.

For example, suppose network device 120 has been configured to SPAN traffic ingressing port 140 to SD port 150. Packet 301 arrives and is copied to buffer space 310 of buffer 305, which is associated with port 140. Port 140 determines (e.g., from a header of packet 301) that packet 310 should be forwarded to port 145 for egress. Port 140 makes a first replica of packet 301 from buffer space 310 and transmits the replica 302 to port 140. Before purging the copy of packet 301 from buffer space 310, port 140 makes a second replica of packet 301 from the same buffer space 310 and transmits the replica 303 to port 150. The FC packet occupies a single buffer but multiple pointers to this packet are created to generate as many copies of the FC packet as required by the user.

According to preferred embodiments, the same process would be followed if network device 120 had been configured to SPAN traffic egressing port 145 to SD port 150. However, if packet 301 had a destination address indicating that packet 301 should egress port 333, then no replica of packet 301 would have been sent to SD port 150.

The following guidelines apply to preferred implementations for configuring a VSAN as a source. First of all, traffic on all interfaces included in a source VSAN is preferably spanned only in the ingress direction. Each SPAN session represents an association of one destination with a set of source(s), preferably along with various other specified parameters, to monitor the network traffic. The network traffic from all the sources is replicated to the destination port where it can be analyzed using any off-the-shelf FC analyzer. One SD port can preferably be used by one or more SPAN sessions. Each session can preferably have several source ports and one destination port. To activate a SPAN session, at least one source and the SD port should be up and functioning. Otherwise, traffic should not be directed to the SD port.

Remote SPAN ("RSPAN")

Alternative embodiments of the invention involve the configuration of network devices for RSPAN operation, thereby allowing an FC analyzer to monitor remotely traffic on one or more switches across a network or on another network. RSPAN is a method whereby a replica of the traffic being monitored is sent to an SD port on a remote switch instead of an SD port on a local switch.

Encapsulation

Some of the embodiments of invention for SPAN and RSPAN support encapsulation on the replicated packets. Encapsulation may be used to implement the RSPAN by encapsulating the RSPAN frames with routing information to transport it to a remote switch. Encapsulation can also be used for the retention of other information that may be germane to a debugging operation after transport through an intervening device or network.

Figure 7:
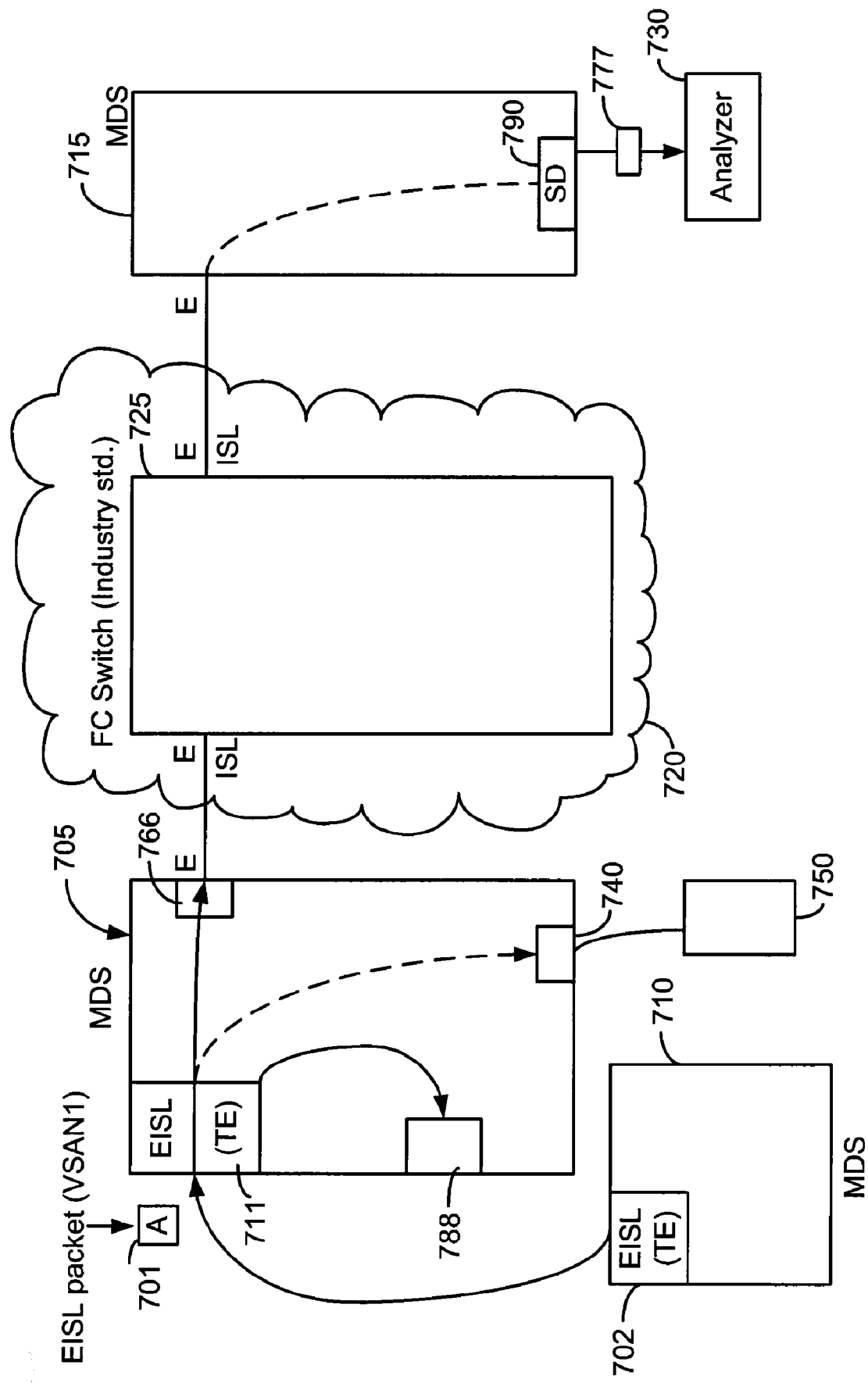
FIG. 7 illustrates an implementation of RSPAN.

For example, encapsulation allows packet 701 of FIG. 7 to be transmitted to remote SD port 790 via intervening network 720. The routing information in packet 701 indicates where the packet should go. Within a network device (e.g., within network device 705), we can force packet 701 to be routed to a local (internal) port. However, if packet 701 is going outside of network device 705 and into network 720, the routing information in the incoming packet 701 will be different from the routing information the packet after it is sent to network 720. The goal of ingress SPAN, however, is to replicate the incoming packet, e.g., the condition of packet 701 as it ingresses port 711.

Moreover, there is information that is on the wire that gets stripped off by a standard switching cloud such as intervening network 720. With encapsulation, we can make a bigger packet and send more information along a heterogeneous environment. In this way, we can add information and get it to the SD port.

Some of this information may be critical for understanding what is happening inside a switch, e.g., the classification information about the frame that went through, time stamps, indexing information (source and destination information), etc. If the packet needs to leave the switch in question and travel across a network before entering the analyzer, this information would normally be stripped off and would not be accessible to the analyzer. Unless this information is encapsulated, it will be stripped off after it leaves the switch.

Referring again to FIG. 7, suppose there is a problem with port 711 of MDS switch 705. We are ingress spanning from port 711 to SD port 790 of switch 715, across network 720. EISL packets arrive at port 711 from switch 710. Here, network 720 includes industry standard FC switch 725, but network 720 could be any other network, e.g., an IP cloud. The problem to be solved is to include information about the traffic through port 711, e.g., the VSAN number of packet 701, that is part of the EISL header and would ordinarily be stripped off by network 720. The solution is to encapsulate packet 701 with the additional information that would otherwise be stripped off.

In order to solve these problems, packet 701 is encapsulated by network device 705 for transmission through intervening network 720. The encapsulation may be of various types, such as using a separate VSAN (or VLAN), using an FC encapsulation header, an IP/GRE encapsulation header or an MPLS encapsulation header.

Figure 8A:
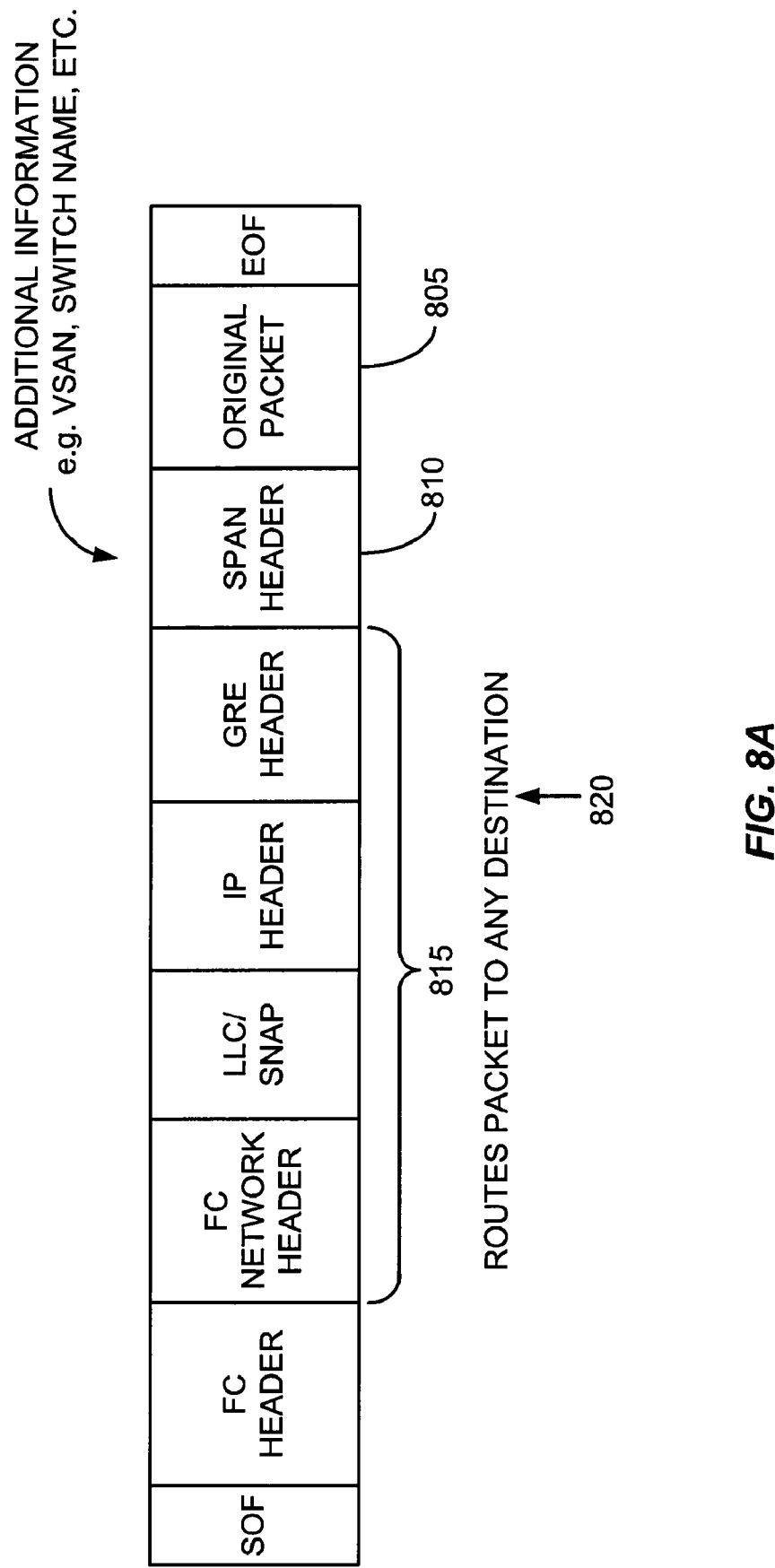
FIG. 8A depicts an exemplary encapsulation according to one aspect of the invention.

FIG. 8A is a schematic diagram that indicates how to encapsulate packet 701 according to one implementation. Here, packet 701 is encapsulated by fields 810 and 815 to form encapsulated packet 820, suitable for transmission through intervening network 720. Field 815 is a routing field that may form a tunnel through intervening network 720. For example, routing field 815 may indicate an IP GRE, which indicates every "hop" through intervening network 720. Here, field 810 is reserved for a SPAN header. The SPAN header may be of the types described in the FC Over FC Encapsulation section, above. Alternatively, the SPAN header may have another format and/or include other information.

There may also be a problem with the analyzer not being able to recognize the output format of an SD port, e.g., EISL. For example, in FIG. 7, suppose that SD port 790 is feeding spanned EISL packets to analyzer 730, which does not recognize EISL. If an EISL packet is spanned to analyzer 730, analyzer 730 will not be able to process the EISL packet.

Therefore, some implementations of the present invention allow the user to select an output format readable by the analyzer. Some such implementations convert an EISL packet to an ISL packet. If analyzer 730 can parse an EISL packet, packet 777 may be sent in EISL format.

FC Over FC Encapsulation

It will sometimes be desirable to implement RSPAN across an FC network that does not recognize a format (such as EISL) that is used to implement VSANs, etc., in a SAN. In some such implementations, a FC frame is encapsulated with an appropriate FC header that can be routed to the destination switch across such an FC network. Along with the original FC packet additional SPAN headers can also be sent with the Remote SPAN frame. The additional SPAN header can contain important information such as classification data, switch state, etc., that would be extremely useful in troubleshooting or data analysis.

The destination switch proxies a port that acts as the target for the encapsulated traffic. Once the RSPAN frame reaches the destination, it will be decapsulated and then will egress through an SD port. An FC tunnel will be set up (e.g., by supervisor software), with an appropriate FCID allocation that will be used for encapsulation. The FC tunnel can also work with statically allocating the FC route that will be used for carrying the Remote SPAN traffic. Such implementations are useful, because non-critical paths can be used to do the debugging and not affect the throughput on loaded links.

According to some implementations, the FC over FC encapsulation may be as follows:

| New FC Header | SPAN (opt.) Header(s) | Orig. FC Header | Orig. payload | EOF | CRC |
|---|---|---|---|---|---|
| 24 | 4 or 44 | 24 | 0-2112 | 4 | 4 | units: Bytes.

In some implementations, there are two kinds of SPAN headers. The SPAN Short Header Format may be used when throughput of frames is important. By using the short format, replicated frames can be flagged with vital information that will be useful for decapsulation. In one implementation, the SPAN Short Header Format is as follows:

| Ver | T | E | resv | ssn | resv | orig. frame len |
|---|---|---|---|---|---|---|
| 31-28 | 27 | 26 | 25-20 | 19-16 | 15-13 | 12-0 |

4 Bytes

Ver: Version; T: Truncation bit; E: Extended SPAN header present; resv: reserved; ssn: Session id; resv: reserved; original frame length: length of the encapsulated frame.

In some preferred implementations, the extended SPAN header format can contain additional debugging information. For example, it can contain internal switch information as well as the classification result for the original frame, such as VSANs, output index, priority level etc. In one implementation, the extended SPAN header format is as follows:

| Switch WWN (8 BYTES) |
|---|
| MDS internal Header (16-32 BYTES) |

The Extended header is preferably attached after the SPAN short header. The 'E' field in the short header indicates whether the extended header is present. There is only one set of EOF and CRC is sent in the Remote SPAN frame. This helps to minimize the cost of encapsulation.

Filtering

Referring again to FIG. 3, we will consider how network device 120 may apply filters to refine further the packets to be sent to an SD port. Filtering can be a powerful tool when troubleshooting, because one wants to be able to isolate certain characteristics.

For example, it is often desirable to filter by VSAN number, or by a range of VSAN numbers. The traffic flowing in different VSANs can be completely unrelated. So, for troubleshooting purposes it is more useful to see traffic on only a particular VSAN or selected few VSANs at a time. As noted above in the discussion of EISL, a "trunking port" or "TE" port can support multiple VSANs. In many networks, different clients are assigned one or more VSAN numbers. Accordingly, if port 140 were configured as a TE port, port 140 could be processing packets having a variety of VSAN numbers corresponding to numerous clients, only some of which (perhaps only one of which) are experiencing problems. There may be multiple ports supporting the same VSAN and one may need to monitor more than one port. An appropriate filter could select a particular VSAN or range of VSANs.

Therefore, in preferred implementations one can perform VSAN-based filtering to selectively monitor network traffic on specified VSANs. For example, suppose packet 301 is in EISL format and its header indicates that it has a VSAN number of 22. Port 140 may be configured to SPAN only packets having a VSAN number of 55. In this case, a replica of packet 301 would not be sent to the SD port.

A VSAN filter can preferably be applied to a selected source or to all sources in a session. Only traffic in the selected VSANs is spanned when one configures VSAN filters. Some implementations allow two types of VSAN filters can be specified, known as "interface level filters" and "session filters." Interface level VSAN filters can be applied for a specified TE port or trunking port channel to filter traffic in the ingress direction, the egress direction, or in both directions. A port channel is a logical interface including multiple FC-links that act as a single link. A trunking port channel can carry traffic on multiple VSANs in a manner similar to that of a trunking (TE) port.

A session filter filters all sources in the specified session. Session filters are bi-directional and apply to all sources configured in the session.

If no filters are specified, the traffic from all active VSANs for that interface is preferably spanned. The effective filter on a port is the intersection (filters common to both) of interface filters and session filters. While any arbitrary VSAN filters can be specified in an interface, in some implementations traffic can only be monitored on the port VSAN or on allowed-active VSANs in that interface. When a VSAN is configured as a source in some implementations, that VSAN is implicitly applied as an interface filter to all sources included in the specified VSAN.

Alternatively, one may wish to filter packets according to their FSPF (Find Shortest Path First) category. FSPF is the routing protocol for FC. The present assignee has developed unique extensions for FSPF, known as "FSPF2." Filters for either or both of these routing protocols may be advantageously used to isolate traffic to or from destinations of interest. MDS supports filtering of SPAN traffic on any of the FC header fields in the Fibre Channel packet, classification information like access control, forwarding, QOS etc. as well.

Exclusionary Filtering: In some instances, a troubleshooter may want to see traffic that does NOT fit a particular pattern. Suppose there are 2 switches (e.g., network devices 110 and 120 of FIG. 3) and a link between them (here, link 350). Under normal circumstance, one might expect to see traffic only from one domain to another on link 350.

Therefore, it may be useful to see traffic that does NOT fit this pattern, e.g., only packets that fail a CRC or packets that are from an unexpected domain (suspected security violators). Under this paradigm, one does not want to see any result that is normal, only the irregularities. Instead of giving thousands of examples of what to SPAN, one could indicate (e.g., with an exclusionary Boolean command) what one doesn't want to see. Alternatively, one could SPAN any command that is not allowed. For example: "SPAN [all commands other than SCSI READS]."

Re-Writes

As noted above, in preferred embodiments of the invention, a replica of a packet is sent to the SD port from a buffer associated with the ingress port, whether ingress or egress SPAN mode is employed. However, in many instances, the packet is changed inside a network device such that the packet coming in is not the same as the packet going out. The packet may be altered in many ways, such as header modification, etc. Either the original version of the packet or the rewritten packet may be spanned.

Figure 4:
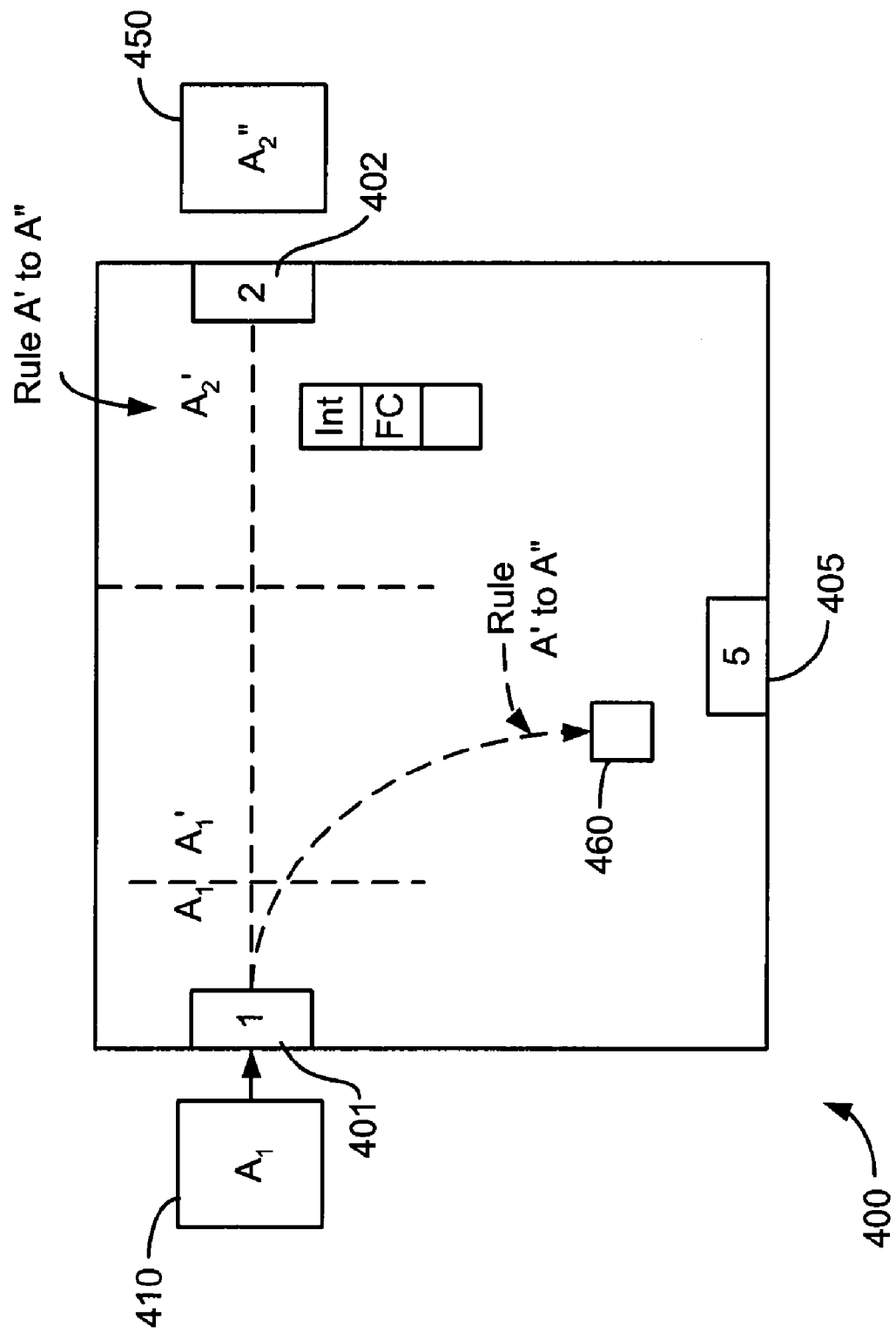
FIG. 4 illustrates a rule-based implementation of SPAN.

However, the ingress port may not have enough information to SPAN accurately a replica of the packet that egresses the network device. Referring to FIG. 4, for example, suppose network device 400 is configured to SPAN traffic egressing port 402 to SD port 405. Ingress port 401 of network device 400 may not have enough information accurately to SPAN a replica of packet 450 that egresses port 402. This may be true, for example, because both ports 401 and 402 may re-write packet 410 in some way. Here, a rule is applied at egress port 402 (e.g., internal switch information, TTL, etc.).

Therefore, in preferred implementations of egress SPAN, the same rule is applied to the spanned packet 460 that is forwarded from port 401 to SD port 405. According to some such implementations, a database for SD port 405 is populated with rules applicable to packets egressing port 402. For example, a rule engine and a rewrite engine may be attached to each output.

The rules may be in the general format of "IF [condition], then [action]."

E.g., for egress spanning from port 402 to port 405:
1. BRING all rules $R_2 \rightarrow R_2'$
2. INPUT to rules $R_2:R_2'$ [IN (meaning characteristics of the input packet), $A_1'$]$\rightarrow A_1''$ IN is defined, for example, as VSAN (e.g., what the VSAN was at $A_1'$), port index, priority, etc.

Figure 5:
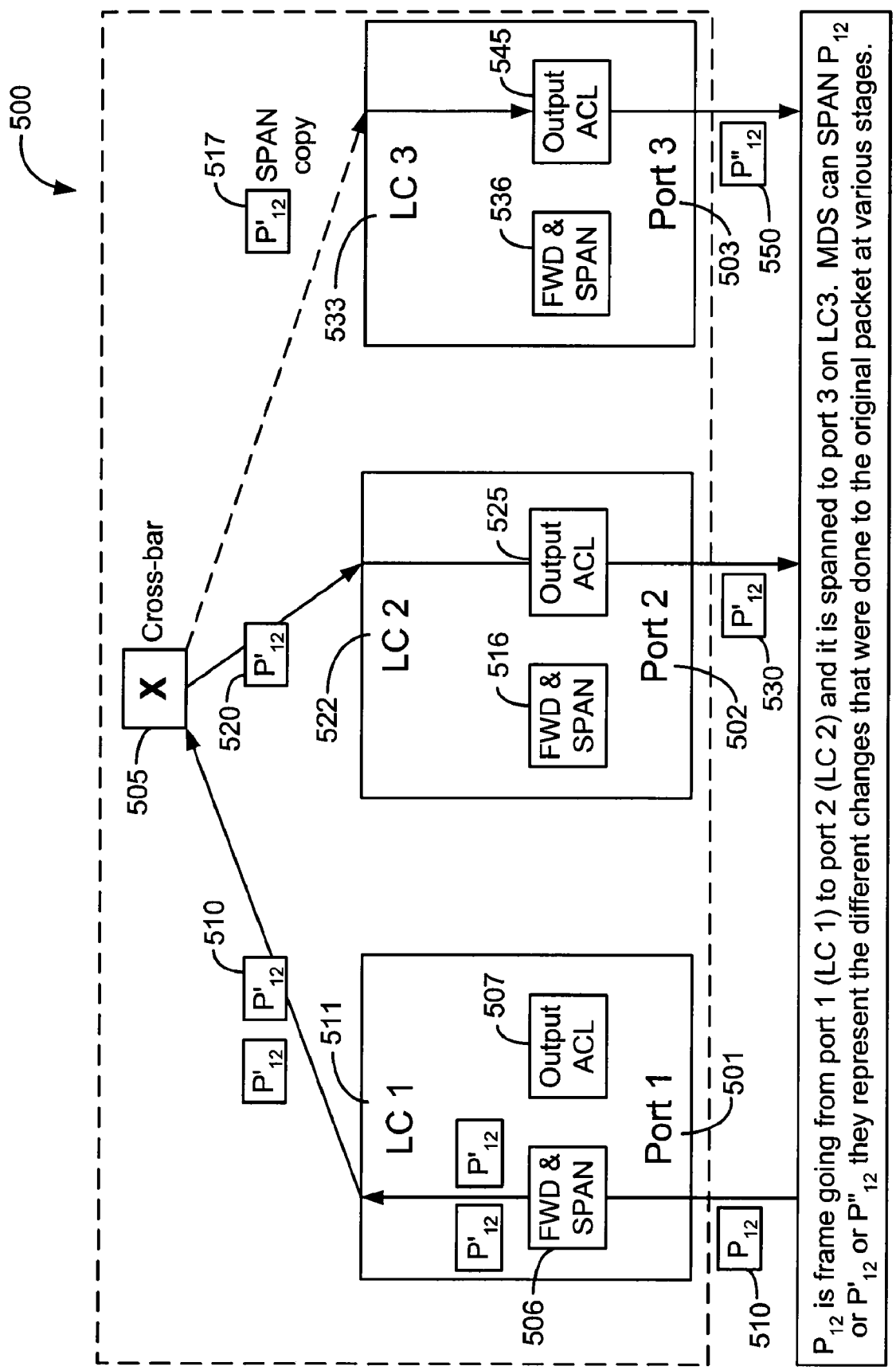
FIG. 5 illustrates a rule-based implementation of SPAN.

Another example of applying rules to effect re-writes is shown in FIG. 5. Here, network device 500 is configured to SPAN packets egressing port 502 to SD port 503. Packet 510 comes to port 501 and line card 511. The forwarding engine 506 forwards packet 510 to port 502, which is resident in line card 522. After packet 520 goes to crossbar 505, packet 520 proceeds to port 502.

Suppose that a rule is implemented in line card 522 indicating that packet 520 should be dropped. Port 501 and line card 511 do not know about the rule in line card 522 that causes packet 520 to be dropped. Therefore, line card 511 sends a replica of packet 510 to SD port 503. However, at SD port 503, there is a copy of the rule in line card 522, so SPAN replica 517 is dropped. If the rule had NOT been applied at SD port 503, the SPAN operation (replicating packet 510 to the SD port) would have provided misinformation about what is going out on port 502.

The opposite is true. Suppose network device 500 is configured to SPAN packets ingressing port 501 to SD port 503. Even if there were a rule in line card 511 to drop packet 510 (e.g., an input ACL), one may still be interested in seeing packet 510, so a replica of packet 510 is sent to SD port 503.

Multicast/Broadcast

Figure 6:
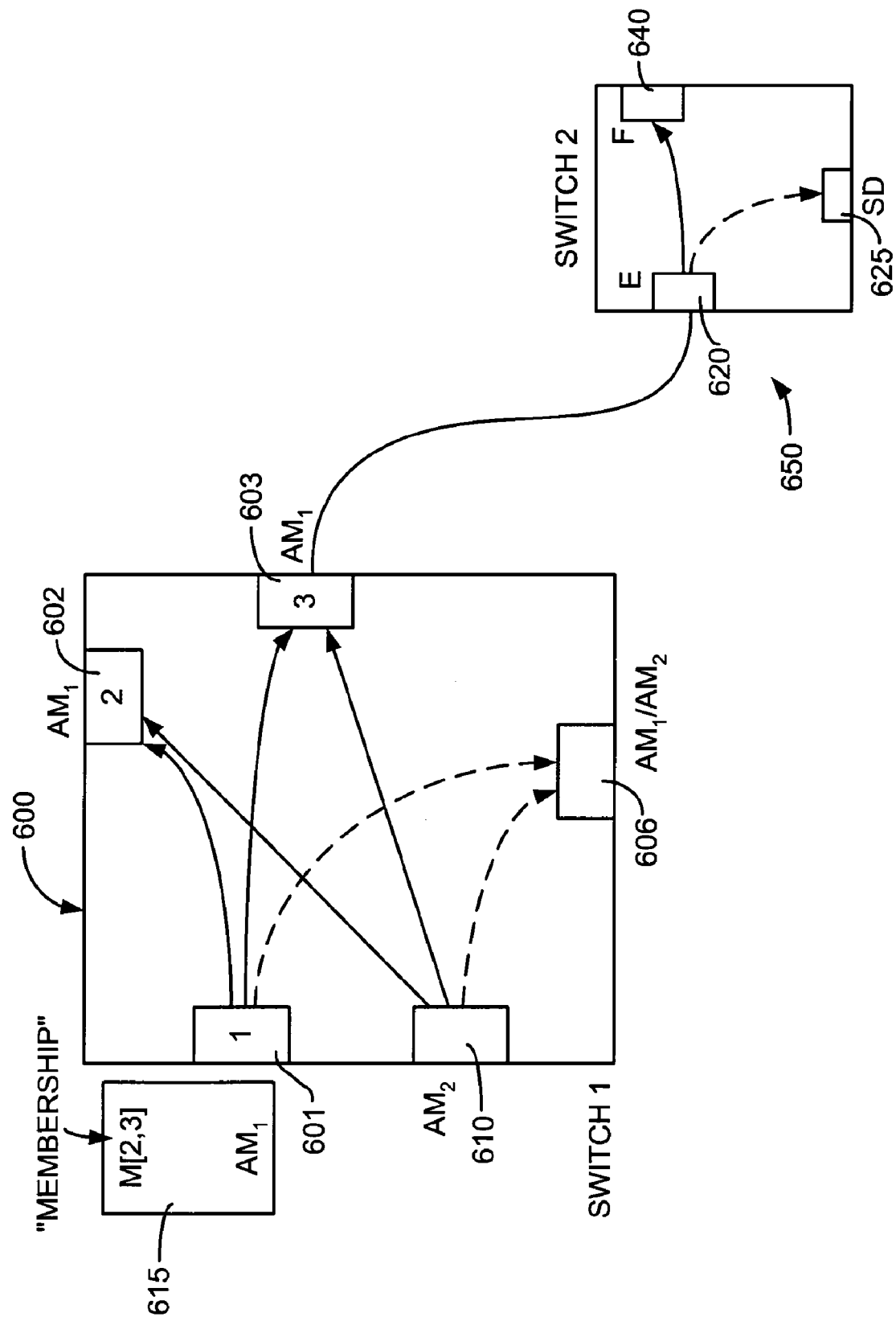
FIG. 6 illustrates multicasting combined with SPAN.

Referring now to FIG. 6, ingress spanning of a multicast packet allows a single replica of packet 615 to be made at port 601 and sent to an SD port (e.g., SD port 606). The same packet is multicast from port 601 to ports 602 and 603. If egress SPAN filtering is used, e.g., for port 602, in some implementations only a single replica of the packets that egress port 602 is sent to the SD port. Similarly, if egress SPAN filtering is used for a packet multicast to ports 602 and 603, a single replica of the multicast packet is preferably sent to the SPAN port.

For both the ingress and egress SPAN of Multicast packet only one replica of SPAN frame is generated. So, when 615 is used as ingress SPAN source, even though two replicas of the Multicast frame were sent to ports 601 and 602, only one replica of the frame is sent as SPAN frame to 606. In either case, the replicating is preferably done at ingress port 601.

Suppose we are ingress spanning a multicast that is going to port 640 (e.g., via ports 603 and 620) and the SD port is in network device 650. In different implementations, there may be a discrepancy as to how many copies of the multicast should be created (to go through port 603 to network device 650). In some embodiments, two copies go through: one is a multicast packet spanned on port 601 and another is a multicast packet bound for port 640. Preferably, there is only a single replica of multicast frames going out to more than one port.

Reliable and "Unreliable" SPAN

In some implementations, the features of SPAN and/or RSPAN are integrated with the FC flow control mechanism of buffer-to-buffer credits. Unless the SPAN packet is delivered to the SD port, the buffer space is not released. Buffer to buffer credits are not sent to the source unless all of the SPAN copies have been sent to the SD port and the input buffer space has been purged. If anything connected on the analyzer cannot pull in data at a particular rate, the SD port signals the sources to slow down the rate of data transmission.

Reliable SPAN

Fibre Channel (FC) protocol is very reliable: as a general rule, dropping packets is forbidden. Whenever one device sends a packet to another device in FC (the next hop, not end points as in TCP), buffer-to-buffer credits are exchanged between the devices. Suppose there is a 2 Gb/sec connection coming into port 601 of FIG. 6 and a 1 Gb/sec connection between port 601 and SD port 606. Only 1 Gb/sec of the incoming 2 Gb/sec can be routed to port 606.

During operation by "reliable SPAN," packets come in and consume buffers within network device 600. When buffers allocated to a particular port (e.g., port 601) are full, no other packet will be sent to that port. Packets are released when they have completed transmission through the switch. The packet is replicated once to go to its intended destination and the packet is replicated a second time to go to the SD port. The buffer span is released only when all the required SPAN copies of the FC frame are completed. Then, another packet may come into port 601. Because of this delay, there may be some times when no additional packets may be sent to port 601.

Unreliable SPAN

With "unreliable SPAN," it is recognized that input buffers are being used up by pending SPAN descriptors, corresponding with packets that will be sent to the SPAN port. Anything new that arrives will not be spanned. The packet is sent to its original destination port, but the SPAN descriptor is dropped. By dropping the SPAN packet descriptors that should have gone to the SD port when there is congestion, the system will not be slowed down and higher throughput can be maintained. However, not all packets will be spanned that would otherwise (with reliable SPAN) have been spanned.

Figure 8B:
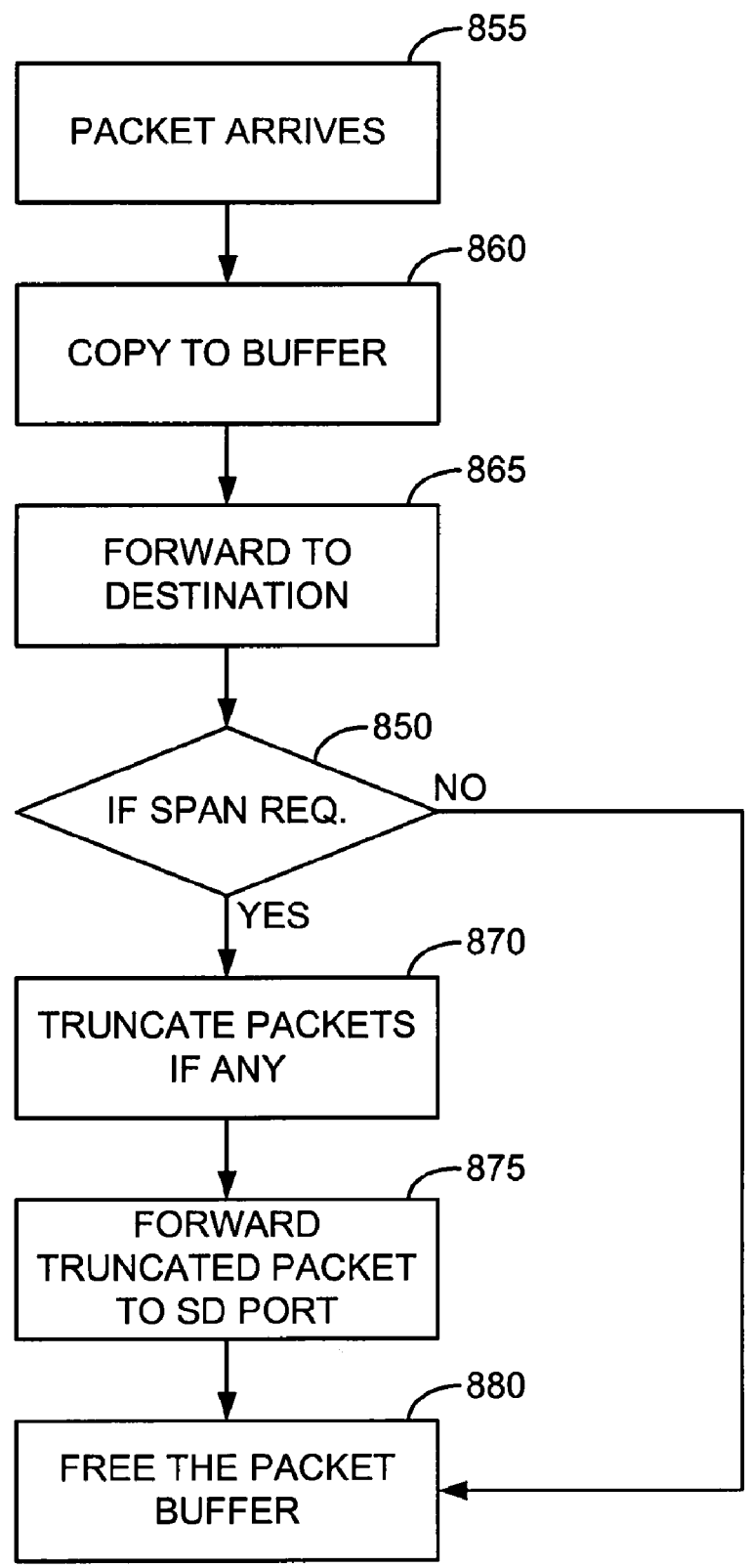
FIG. 8B is a flow chart that outlines a truncation process according to some aspects of the invention.
Figure 8C:
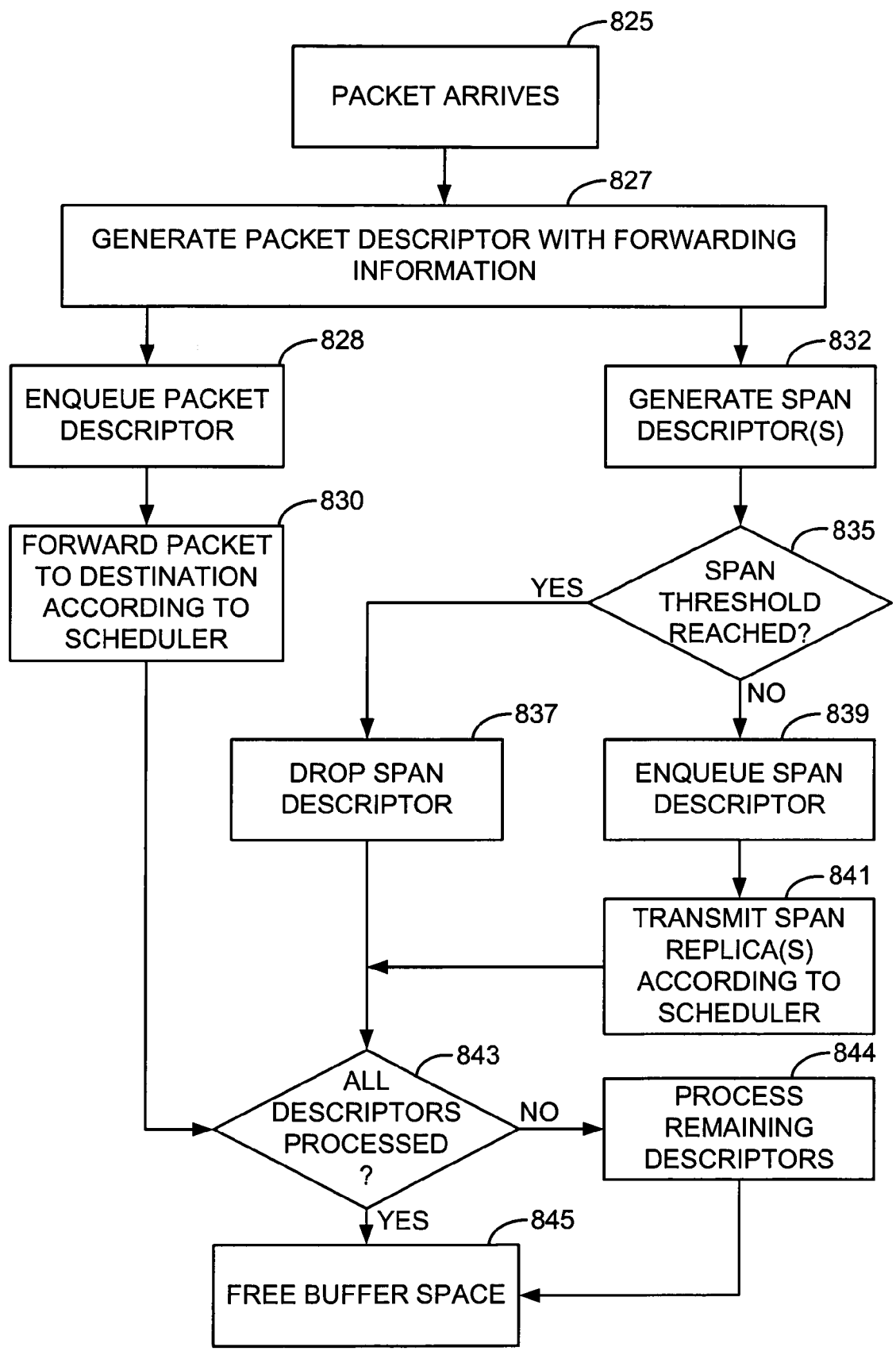
FIG. 8C is a flow chart that depicts an exemplary implementation of unreliable SPAN.

FIG. 8C is a flow chart that depicts an exemplary implementation of unreliable SPAN. In step 825, a packet arrives at an ingress port (e.g., port 711 of FIG. 7). In step 827, a packet descriptor is generated that includes forwarding information for the packet. The packet descriptor is enqueued, e.g., in a virtual output queue associated with the ingress port (step 828). As noted above, the payload and most other packet information is preferably stored elsewhere, e.g., in a random access memory. Accordingly, pointer information would also be generated and enqueued with the packet descriptor. The packet is forwarded to a destination (e.g., to port 788) in step 830, according to a scheduler.

The scheduler may be, for example, a simple round robin selection of all the virtual output queues which have at least one packet resident, and also have at least one transmit credit (transmit credit means the egress port has a fibre channel transmission credit from the downstream switch). Queues without credit (or with no packets) are simply skipped until those conditions are met.

In step 835, it is determined whether a SPAN queue has reached a predetermined capacity. For example, the determination may be that a programmable threshold has been reached, in that a certain number, percentage, etc. of buffer spaces are full. This determination may be made, e.g., by a line card associated with the port.

If the threshold has been reached, the SPAN descriptor or descriptors are dropped in step 837. If the threshold has not been reached, the SPAN descriptor or descriptors are enqueued (step 839). One or more replicas of the packet are subsequently spanned, according to the scheduler and the descriptors. Preferably, each descriptor corresponds to a SPAN replica that will be sent.

In step 843, it is determined whether all descriptors associated with the packet have been processed. If so, the buffer space(s) allocated for the packet are freed in step 845. If not, the remaining descriptors are processed (step 844) and then the buffer space(s) are freed.

Truncation

Very often, the most pertinent information for troubleshooting is in the header of a packet. One often does not need to look at all of (or any of) the payload. According to some implementations of the invention, spanned packets are truncated, e.g., by cutting out some or all of the payload. Preferably, the ingress port implements this truncation before packets are sent to the SD port. Accordingly, this truncation process is different from that described in U.S. patent application Ser. No. 10/409,427, wherein packets are truncated after egressing an SD port but prior to being sent to an analyzing device.

Truncation has at least 2 advantages. First, in the above-described situation in which there is a faster connection to the input port than there is to the SD port, truncating the packets can allow all packets to be sent to the SD port. In other words, "unreliable SPAN" need not be invoked to drop packets in order to maintain throughput.

The second advantage is that the payloads may contain confidential information that is unnecessary for debugging, etc. Such information may include intellectual property, financial information, medical records, personnel records, etc. Removing the payload therefore reduces concerns regarding the dissemination of personal, proprietary or otherwise confidential information. Moreover, if packets are truncated, the analyzer does not require as much memory space for each packet.

FIG. 8B is a flow chart that outlines a truncation process according to some aspects of the invention. In step 855, a packet arrives at an ingress port (e.g., port 711 of FIG. 7). In step 860, a copy of the packet is stored in a buffer associated with the ingress port. A replica of the packet is forwarded to a destination (e.g., to port 788) in step 865.

In step 850, a determination is made as to whether a replica of the packet should be forwarded to an SD port. If not, the packet buffer is freed in step 880. If so, the packet is truncated (step 870). In some implementations, the packet's payload is entirely removed and in other implementations the packet's payload is partially removed. In step 875, the truncated packet is forwarded to an SD port (e.g., to port 740).

Decryption

With encrypted links, undecipherable traffic comes into and goes out of a network device. When encrypted data comes into the port, such data are decrypted. If it goes out on another port, these data are re-encrypted.

Ingress SPAN should be observing exactly what is coming into a port. If there is an encrypted packet coming in and you SPAN it, it is useless to the SD port because of the encryption. According to some implementations, the SD port has the option of receiving an unencrypted or an encrypted version of the incoming packet.

ST Port ("Reflector Port")

Figure 9:
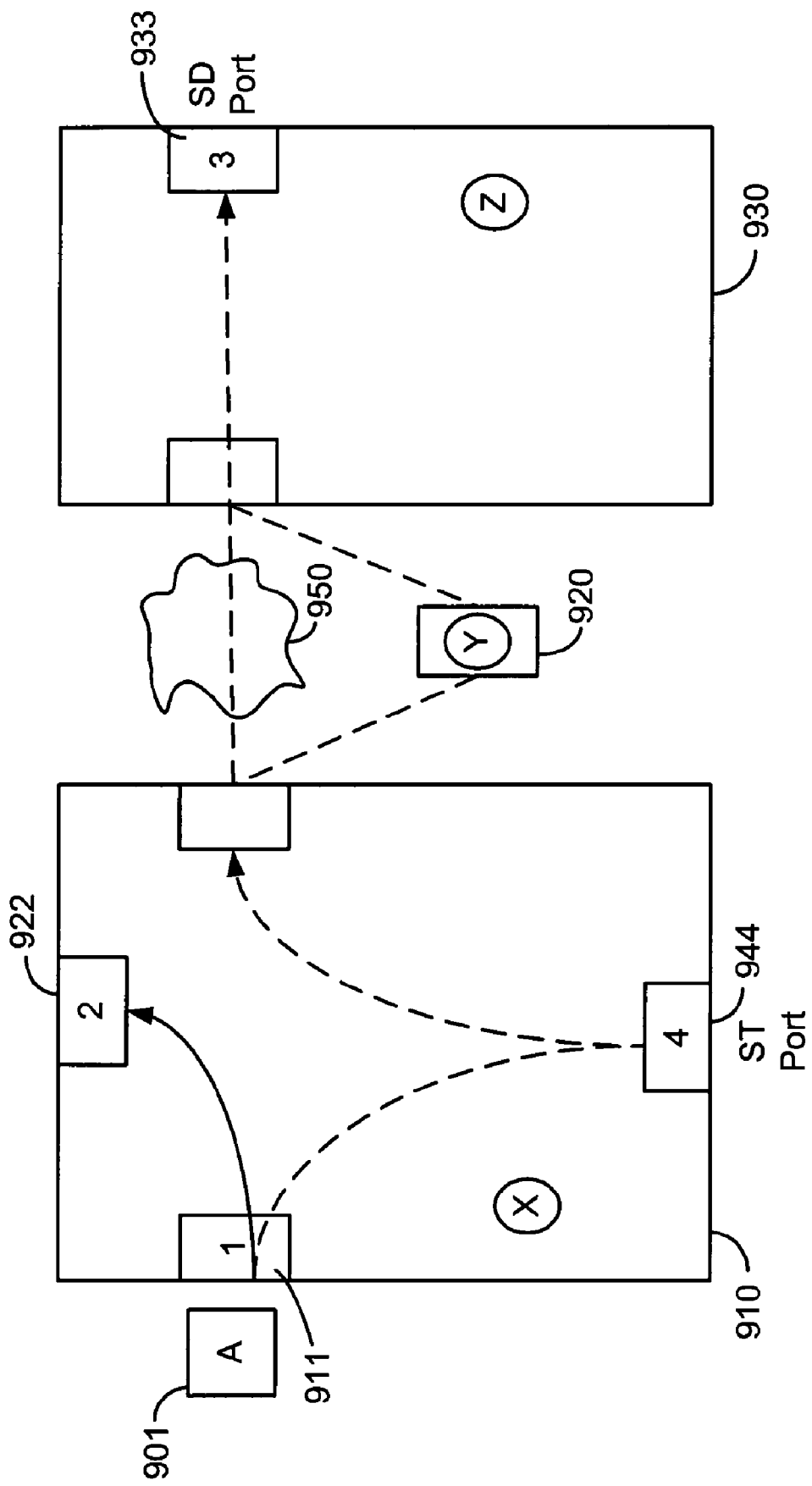
FIG. 9 illustrates an implementation of RSPAN.

There are other ways of spanning to a remote SD port via an intervening network such as an IP network or a non-Andiamo FC network, one of which will now be described with reference to FIG. 9. Suppose we want to "ingress SPAN" packet 901, which is arriving at port 911 and is intended to egress via port 922. In order to send a replica of packet 901 to remote SD port 933, packet 901 may be encapsulated with routing information so that it can go through network 950. The routing information may, for example, set up an MPLS FC tunnel.

A "tunnel" means that the entire route is configured. For example, switch 910 may be configured to send all traffic to switch 920. Switch 920 may be configured to send all traffic from switch 910 to switch 930. Switch 930 may be configured to output all packets received from switch 920 to SD port 933. In some implementations, EISL may be used to carry information regarding the pre-existing MPLS protocol, in order to set up the tunnel.

Here, the header is set up at ST port 944. The reason for creating the header at ST port 944 is that in some implementations, the SPAN copies are created before the routing encapsulation engine has engaged. In other words, first forwarding decision and SPAN logic on the packet 901 is completed and when the encapsulation needs to be done the opportunity to re-write packet 901 is over. As a result, the encapsulation cannot be put on at port 911. That is why packet 901 goes to a SPAN replicator where the packet again goes through the re-write mechanism when it is encapsulated. Packet 901 has to look different for the remote SPAN than from the original packet. Therefore, an unmodified replica of packet 901 is sent to ST port 944 directly. At ST port 944, the desired routing information is encoded (the "tunnel" is created).

The underlying problem solved by using ST port 944 is that whenever we have to SPAN a packet, two decisions must be made: (1) whether to SPAN the packet and (2) whether the packet requires encapsulation. These determinations are preferably made at the ingress port (e.g., at port 911). The opportunity to encapsulate is present before the ability to detect whether spanning is necessary. In this implementation, the decision step (1) is done at the ingress source port and all spanned packets are sent to ST port 944. The step (2) is performed at the ST port, which puts on a special header (e.g., an EISL header) to create the proper encapsulation necessary to route the packet to remote SD port 933.

Prevention of Recursive Monitoring of RSPAN Frames Carried Over a Trunk Source

Remote SPAN traffic can use a trunk port to reach the remote SPAN session destination. However, this trunk port can be configured as an egress source for a remote SPAN session. It is desirable that the remote SPAN frames carried through that trunk are not spanned, because this is NOT normal data traffic. If these frames are also spanned, then the sources on the local switch will go in a recursive loop: for each replica of the monitoring frame transmitted through the trunk port, another replica of a monitoring frame would be generated, because as the monitoring frame would also be egressing.

Preferred embodiments uses a special mechanism indicating that a remote-SPAN replica of a spanned frame should not be generated. This is achieved by specially programming the ST port's forwarding decision logic to look at internal header information. The ST port may look at the short and/or the extended SPAN header information, if there is such information. Alternatively (or in addition), there may be a field in another header of the packet that indicates whether the packet is a SPAN packet or not. The header may also include, for example, information about the network device. The ST port detects a spanned frame and it is programmed not to SPAN the frame again. Thus, the ST port only performs the requisite encapsulation for the RSPAN tunnel, but it does not replicate for RSPAN.

Load Balancing of SPAN Traffic

SPAN destination ports can be over subscribed, because more than one interface can be monitored at the same SD port. In such cases, the SPAN traffic requires more bandwidth than one port (e.g., more than an ASIC of one port) can deliver. In most implementations of "unreliable SPAN," the SPAN traffic is delivered on a best-efforts basis, resulting in packet drops at the SPAN destination. In case of reliable SPAN, the sources will be slowed down to the bandwidth handled by one FC interface.

Accordingly, some implementations of the invention use a load-balancing scheme to solve the problem. Load balancing of traffic is a concept commonly used in network switches to aggregate bandwidth of multiple switch ports. However, a load-balancing scheme may also be applied to monitoring traffic to solve the problems mentioned in the background section. The load-balancing approach may be applied in the SPAN destination ports, so that monitoring traffic from more than one source may be achieved without packet drops.

A port channel is used to aggregate bandwidth from multiple links and use them as a single logical links. Load balancing is similar to the function of a port channel in the sense that we can combine multiple SD ports together to span traffic that could be at a higher rate than that of individual links having a maximum throughput of, e.g., 2 G/s. The load balancing of the SPAN traffic can be done using a hash-based scheme similar to one used for the port channels. The traffic from spanning a port channel may be transmitted to another switch and combined back into a higher bandwidth SD port, e.g., a 10 G/s SD port.

For example, in the currently-deployed MDS9000 family of switches, up to 16 switch ports may be configured to be part of port channel that can be a SPAN destination port. The monitoring traffic may be load balanced using the same algorithm(s) used for any traffic (most commonly based on {source, destination addresses, and OX_ID}). The OX_ID is a well-known field in each packet called the exchange ID. It is defined in the fibre channel standard.

The load-balanced SPAN traffic can be aggregated back and captured on a higher bandwidth SD port, such as a 10 G interface. This scheme has the advantage that one can monitor SPAN traffic on multiple links on a remote switch that may have interfaces that can sustain higher link speeds. Load balancing alleviates the problems of slowing sources in reliable SPAN and SPAN frame drops in the case of unreliable SPAN.

Figure 10:
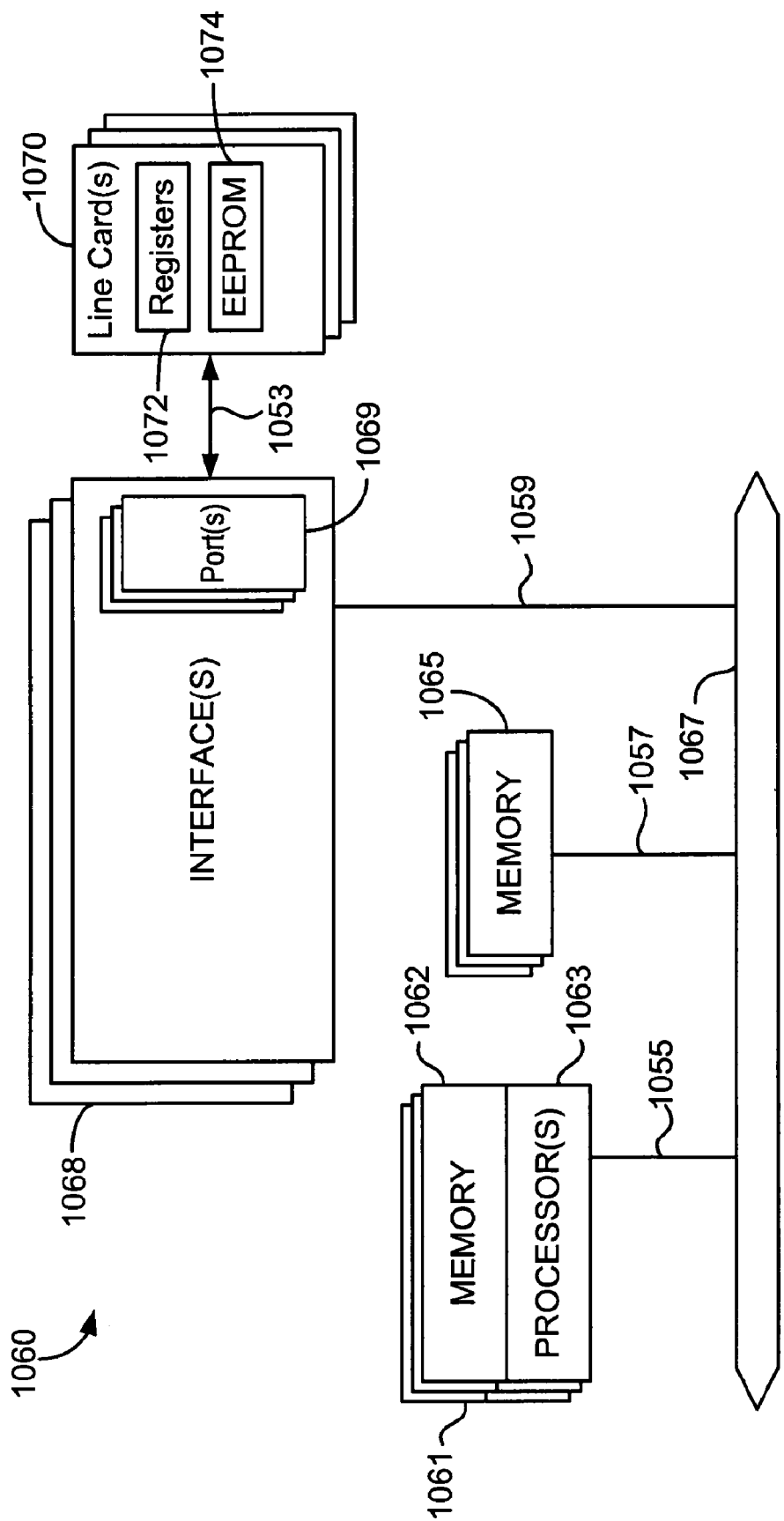
FIG. 10 is a block diagram that depicts a network device according to some embodiments of the present invention.

Referring now to FIG. 10, a network device 1060 suitable for implementing the techniques of the present invention includes a master central processing unit (CPU) 1062, interfaces 1068, and a bus 1067 (e.g., a PCI bus). When acting under the control of appropriate software or firmware, the CPU 1062 may be responsible for implementing specific functions associated with the functions of a desired network device. For example, when configured as an intermediate router, the CPU 1062 may be responsible for analyzing packets, encapsulating packets, and forwarding packets for transmission to a set-top box. The CPU 1062 preferably accomplishes all these functions under the control of software including an operating system (e.g. Windows NT), and any appropriate applications software.

CPU 1062 may include one or more processors 1063 such as a processor from the Motorola family of microprocessors or the MIPS family of microprocessors. In an alternative embodiment, processor 1063 is specially designed hardware for controlling the operations of network device 1060. In a specific embodiment, a memory 1061 (such as non-volatile RAM and/or ROM) also forms part of CPU 1062. However, there are many different ways in which memory could be coupled to the system. Memory block 1061 may be used for a variety of purposes such as, for example, caching and/or storing data, programming instructions, etc.

The interfaces 1068 are typically provided as interface cards (sometimes referred to as "line cards"). Generally, they control the sending and receiving of data packets over the network and sometimes support other peripherals used with the network device 1060. Among the interfaces that may be provided are Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1062 to efficiently perform routing computations, network diagnostics, security functions, etc.

Although the system shown in FIG. 10 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of the network device's configuration, it may employ one or more memories or memory modules (such as, for example, memory block 1065) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

While the invention has been particularly shown and described with reference to specific embodiments thereof, it will be understood by those skilled in the art that changes in the form and details of the disclosed embodiments may be made without departing from the spirit or scope of the invention. For instance, it will be appreciated that at least a portion of the functions described herein could be performed by one or more devices, e.g., by a microprocessor, by a cluster of microprocessors, etc. Considering these and other variations, the scope of the invention should be determined with reference to the appended claims.

We claim:

1. A method, comprising:
    receiving by a network device a Fibre Channel packet, the Fibre Channel packet having a first Fibre Channel header;
    adding by the network device a second Fibre Channel header to the Fibre Channel packet such that the Fibre Channel packet includes the first Fibre Channel header and the second Fibre Channel header; and
    adding by the network device a first switch port analyzer header to the Fibre Channel packet such that the Fibre Channel packet includes the first Fibre Channel header, the second Fibre Channel header, and the first switch port analyzer header, wherein the first switch port analyzer header comprises one or more of the following fields: a version field, a truncation bit field, a session identification field, a reserved field, a field indicating that the Fibre Channel packet includes a second switch port analyzer header and a field indicating a length of an encapsulated frame.

2. The method of claim 1, wherein the second switch port analyzer header comprises a field indicating internal switch information or a classification result field indicating a classification result for the Fibre Channel packet.

3. The method of claim 2, wherein the classification result field comprises one or more subfields indicating a virtual storage area network number, an output index or a priority level.

4. The method of claim 1, wherein the first switch port analyzer header comprises one or more of a field indicating internal switch information or a classification result field indicating a classification result for the Fibre Channel packet.

5. A non-transitory computer-readable medium storing thereon computer-readable instructions for controlling a network device to perform steps, comprising:
    receive by a network device a Fibre Channel packet, the Fibre Channel packet having a first Fibre Channel header;
    add by the network device a second Fibre Channel header to the Fibre Channel packet such that the Fibre Channel packet includes the first Fibre Channel header and the second Fibre Channel header; and
    add by the network device a first switch port analyzer header to the Fibre Channel packet such that the Fibre Channel packet includes the first Fibre Channel header, the second Fibre Channel header, and the first switch port analyzer header, wherein the first switch port analyzer header comprises one or more of the following fields: a version field, a truncation bit field, a session identification field, a reserved field, a field indicating that the Fibre Channel packet includes a second switch port analyzer header and a field indicating a length of an encapsulated frame.

6. The non-transitory computer-readable medium of claim 5, wherein the second switch port analyzer header comprises a field indicating internal switch information or a classification result field indicating a classification result for the Fibre Channel packet.

7. The non-transitory computer-readable medium of claim 6, wherein the classification result field comprises one or more subfields indicating a virtual storage area network number, an output index or a priority level.

8. An apparatus, comprising:
an interface configured for receiving a Fibre Channel packet, the Fibre Channel packet having a first Fibre Channel header; and
a processor configured for adding a second Fibre Channel header to the Fibre Channel packet such that the Fibre Channel packet includes the first Fibre Channel header and the second Fibre Channel header;
wherein the processor is further configured for adding a first switch port analyzer header to the Fibre Channel packet such that the Fibre Channel packet includes the first Fibre Channel header, the second Fibre Channel header, and the first switch port analyzer header, wherein the first switch port analyzer header comprises a field indicating that the Fibre Channel packet includes a second switch port analyzer header.

9. The apparatus of claim 8, wherein the second switch port analyzer header comprises a classification result field indicating a classification result for the Fibre Channel packet.

10. The apparatus of claim 9, wherein the classification result field comprises one or more subfields indicating at least one of a virtual storage area network number, an output index or a priority level.

11. The apparatus of claim 8, wherein the first switch port analyzer header comprises one or more of a field indicating internal switch information or a classification result field indicating a classification result for the Fibre Channel packet;
adding by the network device a second Fibre Channel header to the Fibre Channel packet such that the Fibre Channel packet includes the first Fibre Channel header and the second Fibre Channel header; and
adding by the network device a first switch port analyzer header to the Fibre Channel packet such that the Fibre Channel packet includes the first Fibre Channel header, the second Fibre Channel header, and the first switch port analyzer header, wherein the first switch port analyzer header comprises one or more of the following fields: a version field, a truncation bit field, a session identification field, a reserved field, a field indicating that the Fibre Channel packet includes a second switch port analyzer header and a field indicating a length of an encapsulated frame.

12. An apparatus, comprising:
means for receiving a Fibre Channel packet, the Fibre Channel packet having a first Fibre Channel header;
means for adding a second Fibre Channel header to the Fibre Channel packet such that the Fibre Channel packet includes the first Fibre Channel header and the second Fibre Channel header; and
means for adding a first switch port analyzer header to the Fibre Channel packet such that the Fibre Channel packet includes the first Fibre Channel header, the second Fibre Channel header, and the first switch port analyzer header.

13. An apparatus, comprising:
an interface configured for receiving a Fibre Channel packet, the Fibre Channel packet having a first Fibre Channel header; and
a processor configured for adding a second Fibre Channel header to the Fibre Channel packet such that the Fibre Channel packet includes the first Fibre Channel header and the second Fibre Channel header;
wherein the processor is further configured to add a first switch port analyzer header to the Fibre Channel packet such that the Fibre Channel packet includes the first Fibre Channel header, the second Fibre Channel header, and the first switch port analyzer header, wherein the first switch port analyzer header comprises a classification result field indicating a classification result for the Fibre Channel packet.

14. The apparatus of claim 13, wherein the classification result field comprises one or more subfields indicating at least one of a virtual storage area network number, an output index or a priority level.

15. A method, comprising:
receiving by a network device a Fibre Channel packet, the Fibre Channel packet having a first Fibre Channel header;
adding by the network device a second Fibre Channel header to the Fibre Channel packet such that the Fibre Channel packet includes the first Fibre Channel header and the second Fibre Channel header; and
adding by the network device a first switch port analyzer header to the Fibre Channel packet such that the Fibre Channel packet includes the first Fibre Channel header, the second Fibre Channel header, and the first switch port analyzer header;
wherein the first switch port analyzer header comprises a classification result field indicating a classification result for the Fibre Channel packet.

16. The method of claim 15, wherein the classification result field comprises one or more subfields indicating at least one of a virtual storage area network number, an output index or a priority level.

* * * * *